(12) United States Patent
Cover et al.

(10) Patent No.: US 7,967,100 B2
(45) Date of Patent: Jun. 28, 2011

(54) UTILITY VEHICLE

(75) Inventors: Steven Cover, Newnan, GA (US); Craig Smith, Newnan, GA (US); Satoshi Kubota, Shizuoka (JP)

(73) Assignees: Yamaha Hatsudoki Kabushiki Kaisha, Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 0 days.

(21) Appl. No.: 12/355,854

(22) Filed: Jan. 19, 2009

(65) Prior Publication Data
US 2009/0183938 A1 Jul. 23, 2009

Related U.S. Application Data

(63) Continuation-in-part of application No. 12/017,691, filed on Jan. 22, 2008, now Pat. No. 7,478,861.

(51) Int. Cl.
B62D 21/00 (2006.01)
(52) U.S. Cl. ...................... 180/312; 296/24.34; 180/89.2
(58) Field of Classification Search ............... 296/24.34, 296/24.49, 24.4, 193.07, 204, 63, 64, 65.01, 296/65.13; 180/89.2, 312
See application file for complete search history.

(56) References Cited

U.S. PATENT DOCUMENTS

| 4,514,008 | A  | * | 4/1985  | Watanabe et al. | 296/204  |
|-----------|----|---|---------|-----------------|----------|
| 5,676,341 | A  | * | 10/1997 | Tarusawa et al. | 248/430  |
| 7,287,619 | B2 | * | 10/2007 | Tanaka et al.   | 180/291  |
| 7,367,417 | B2 | * | 5/2008  | Inui et al.     | 180/89.2 |
| 7,506,856 | B2 | * | 3/2009  | Ikegaya et al.  | 248/430  |
| 7,516,998 | B1 | * | 4/2009  | Berg et al.     | 296/65.01|
| 7,540,343 | B2 | * | 6/2009  | Nakashima et al.| 180/65.1 |
| 7,658,440 | B2 | * | 2/2010  | Tohda et al.    | 296/204  |
| 2004/0195034 | A1 | * | 10/2004 | Kato et al. | 180/312 |
| 2008/0093893 | A1 | * | 4/2008  | Garcia Garcia et al. | 296/204 |
| 2008/0251306 | A1 | * | 10/2008 | Kobayashi et al. | 180/89.2 |
| 2008/0289896 | A1 | * | 11/2008 | Kosuge et al. | 180/312 |

FOREIGN PATENT DOCUMENTS
JP 2008-044552 2/2008

OTHER PUBLICATIONS
U.S. Appl. No. 11/889,396, filed Feb. 28, 2008, Kosuge, Hideyoshi.

* cited by examiner

Primary Examiner — Glenn Dayoan
Assistant Examiner — Pinel E Romain
(74) Attorney, Agent, or Firm — Keating & Bennett, LLP

(57) ABSTRACT

A vehicle includes a center console provided with left and right walls, and a top wall, provided to the rear, in the front/back direction of the vehicle, of a front panel. The top wall, extends rearward, in the front/back direction of the vehicle, from a center portion, in the direction of width of the vehicle, of the front panel to at least a front end of a front seat. The top wall is provided at a position that is higher than a bottommost end of a front portion of a seating surface of a seat cushion portion of the front seat and higher than a top end of an engine, and at a position that is lower than a top end of the front panel.

28 Claims, 22 Drawing Sheets

UTILITY VEHICLE

RELATED APPLICATION

This is a continuation-in-part application of U.S. patent application Ser. No. 12/017,691, filed Jan. 22, 2008, now U.S. Pat. No. 7,478,861.

FIELD OF THE INVENTION

The present invention relates to a vehicle wherein a cabin outer frame is structured from a main body frame with a plurality of roof supports made from pipes that are disposed on both the left and the right side portions of the vehicle frame. Roof members connect the roof supports to each other in a manner to create an interior cabin space. The interior space of the cabin includes a special console design which facilitates the interior cabin space being roomy while enabling the vehicle to be compact.

BACKGROUND OF THE INVENTION

Japanese Unexamined Patent Application Publication 2008-44552 illustrates a conventional example of an all terrain vehicle. In this conventional vehicle, the upper portion of the cabin is structured by connecting together the top portions of the front and rear roof supports using roof members, producing a cabin with a feeling of openness.

Additionally, in the aforementioned conventional vehicle, the cabin was structured using the technical concept that the cabin should be as broad as possible.

Specifically, the portion wherein the controls are disposed on the center console is formed so as to be higher than the seats, but further forward in an attempt to make the foot space of the driver and the passenger seated next to the driver be as wide as possible. However, the console must be made small in order to secure this space, and as a result, the space within the console must be narrow, with a problem in that it cannot be used effectively.

SUMMARY OF THE INVENTION

The present invention includes a vehicle having a cabin space with a center console disposed therein that is formed so as to have a larger internal space, while still maintaining the feeling of openness within the cabin space.

The inventor[s] of the present application realized that because the driver and the passenger who is seated to the side of the driver did not move in the direction of width of the vehicle, and thus even if the center console were disposed in the space between the floor there would be essentially no impact on the feeling of openness of the passengers as long as it was not excessively high. Thus, a center console is provided which is constructed in a manner providing a large internal space while not effecting on the feeling of openness of the passengers.

The present invention is a vehicle which includes a vehicle body frame which carries a first roof support and a second roof support. A roof member interconnects the first and second roof supports and defines a cabin space. Left and right front wheels and at least a pair of left and right rear wheels that are supported on the vehicle frame. A front panel is provided to the rear, in the front/back direction of the vehicle, from the front wheels. A left and right front seat offset from each other is provided to the rear of the front panel. A center console is positioned within the cabin space between the front seats. An engine component is bordered by the center console.

Given the vehicle according to the present invention, it is possible to increase the size of the center console without a loss of the feeling of openness, making it possible to obtain an internal space in the center console that is commensurately larger. The result is the ability to use the inner space within the center console more effectively.

DETAILED DESCRIPTION OF THE PREFERRED EMBODIMENT

Figure 1:
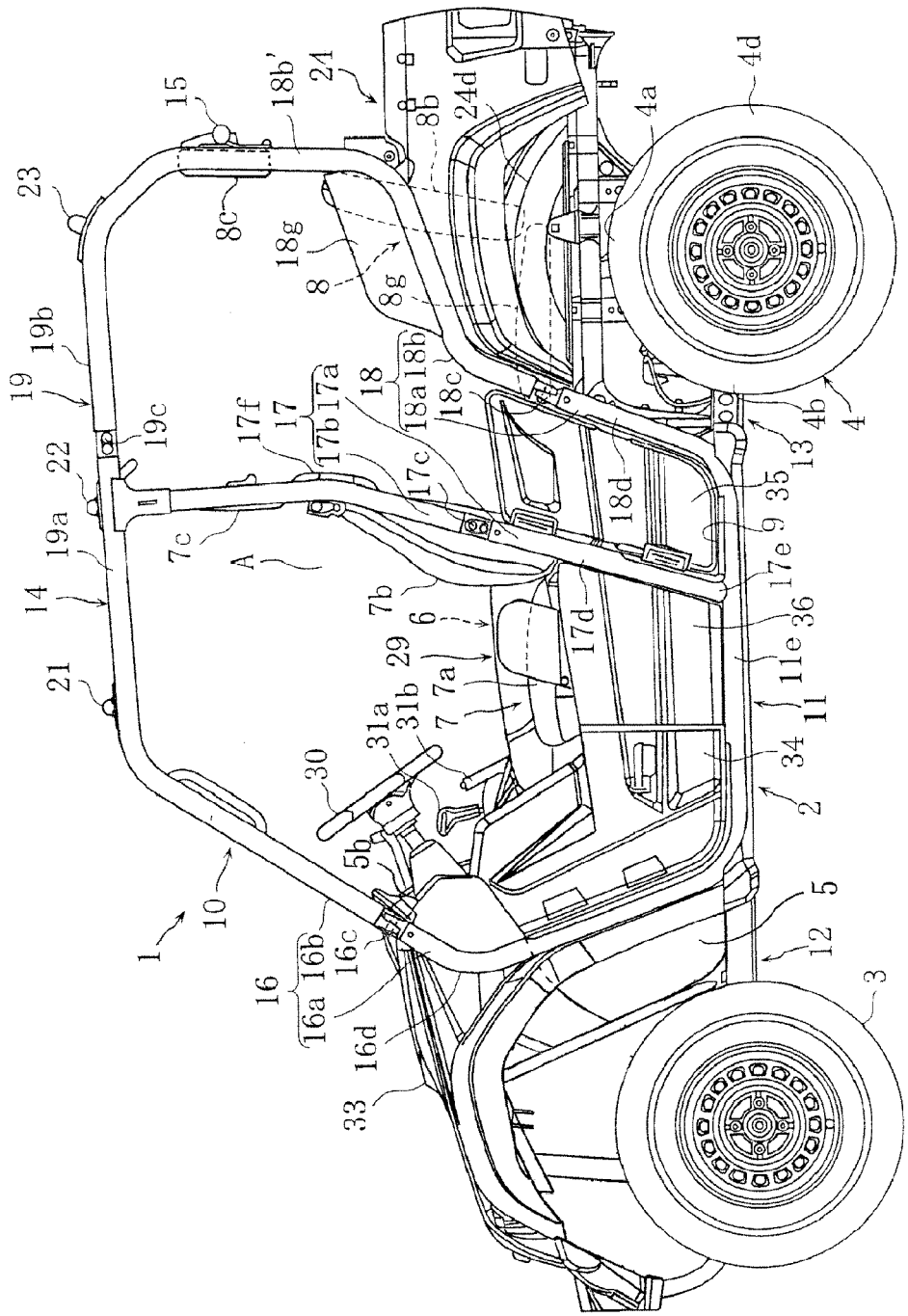
FIG. 1 is a left side view of an all-terrain vehicle as set forth in one embodiment according to the present invention.
Figure 2:
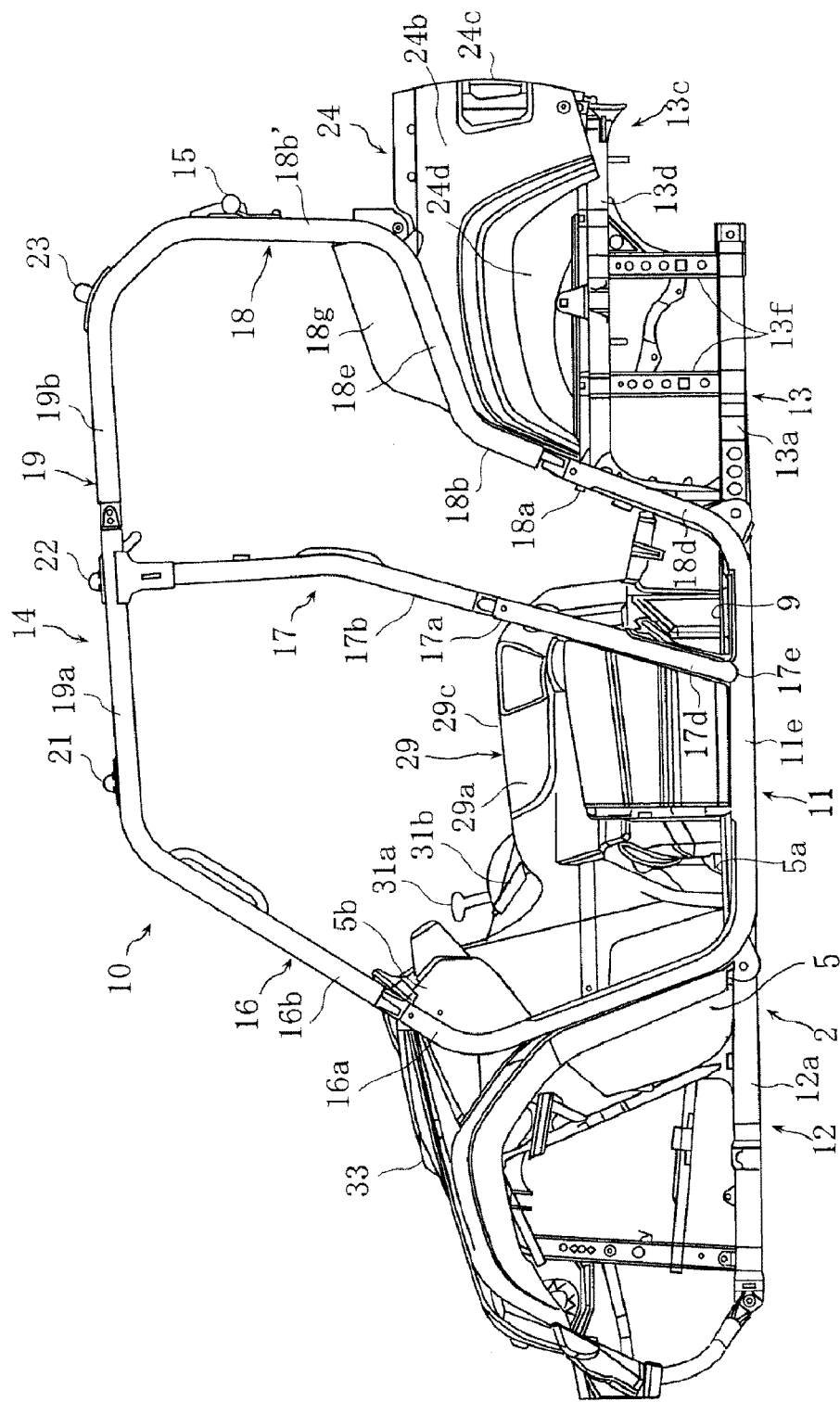
FIG. 2 is a left side view of the state wherein the wheels, seats, doors, etc., have been removed from the vehicle.

Embodiments according to the present invention will be explained below based on the appended drawings.

FIG. 1 through FIG. 22 are drawings for explaining an all-terrain vehicle as set forth in one example of embodiment according to the present invention. Note that in the present specification, "front," "forward," "back," "rear," "left," and "right" refer to "front," "forward," "back," "rear," "left," and "right" when seen from the state when seated in a seat, unless otherwise noted. Also, as shown in the Figures like parts are identified with the same numeral. The front wheels are the same on both the left and right sides, so they are referenced by like numeral 3. In some instances only the left side of the vehicle is shown, but it is understood that similar items on the right side, while not shown, are of similar nature.

As shown in the Figures, all-terrain vehicle 1 is provided with a vehicle body frame 2; a pair of left and right front wheels 3 that are supported on the left and right side portions at the forward portion of the vehicle body frame 2; a pair of left and right rear wheels 4 that are supported on the left and right side portions of the rear portion; a front panel 5 that is disposed to the rear of the front wheels 3 of the vehicle body frame 2 in the front/back direction of the vehicle; and an engine unit 6 that is disposed in the center portion, in the direction of width of the vehicle, to the rear, in the front/back direction of the vehicle, of the front panel 5 of the vehicle body frame 2.

Additionally, the vehicle 1 is provided with: a front seat 7 that is disposed to the rear, in the front/back direction of the vehicle, of the front panel 5 of the vehicle body frame 2; a rear seat 8 that is disposed to the rear, in the front/back direction of the vehicle, of the front seat 7; a rear floor 9 that is disposed at a position that is lower than a top end 4a of the back wheel 4, between, in the front/back direction of the vehicle, the front seat 7 and the rear seat 8; and a cabin structuring member 10, attached to the vehicle body frame 2, for structuring left and right side portions and a ceiling portion of the cabin A.

The vehicle body frame 2 comprises: a center frame 11 that structures the bottom portion of the cabin A; a front frame 12, connected to the front end of the center frame 11, for structuring the front portion of the vehicle 1; and a rear frame 13, connected to the back end portion of the center frame 11, for structuring the rear portion of the vehicle 1.

The center frame 11 is essentially rectangular in the plan view, and comprises: front and rear cross pipes 11a and 11b that are made from round pipes that extend in the direction of width of the vehicle; left and right center main pipes 11c and 11d, made out of square pipes, connecting front and rear cross pipes 11a and 11b at the center portion in the direction of width of the vehicle; and left and right side pipes 11e and 11f, made out of round pipes, connecting at the outside edge portions in the direction of width of the vehicle.

An engine bracket 11g. for mounting the engine unit 6, is also provided between the left and right center main pipes 11c and 11d. Moreover, a floor bracket 11h, for supporting a front floor 5a, extending in the rearward direction, connecting to the front panel 5, is provided between the left and right center main pipes 11c and 11d and the left and right side pipes 11e and 11f.

The engine unit 6 has a structure that can be summarized as a cylinder body 6b, a cylinder head 6c, and a head cover 6d being joined together facing upward at the rear diagonal of the vehicle on the rear portion of the top surface of a crankcase 6a.

In addition, a throttle body 6e is connected to the front wall, in the front/back direction of the vehicle, of the cylinder head 6c. The vacuum pipe 6f is connected to this throttle body 6e, with a surge tank 6g interposed in the middle of the vacuum pipe 6f, with an air cleaner 6h connected at the upstream end thereof An exhaust pipe 6i is also connected to the rear wall, in the front/back direction of the vehicle, of the cylinder head 6c. Additionally, a transmission case 6j that houses a V-belt-type continuously variable transmission is provided on the left side portion of the crankcase 6a.

The engine unit 6 is disposed in an interior space C of the center console 29. The center console 29 comprises a left side wall 29a, a right side wall 29b, and a top wall 29c, and extends in the rearward direction from the center portion, in the direction of width of the vehicle, of the front panel 5 to the rear of the rear end portion of 7g of a seat cushion portion 7a of the front seat 7. Furthermore, as illustrated in FIG. 6, the portion above the transmission case 6j of the engine unit 6 is covered from above and from the left and right sides by a top wall 29c and by a left side wall 29a and 29b of the center console 29.

Figure 5:
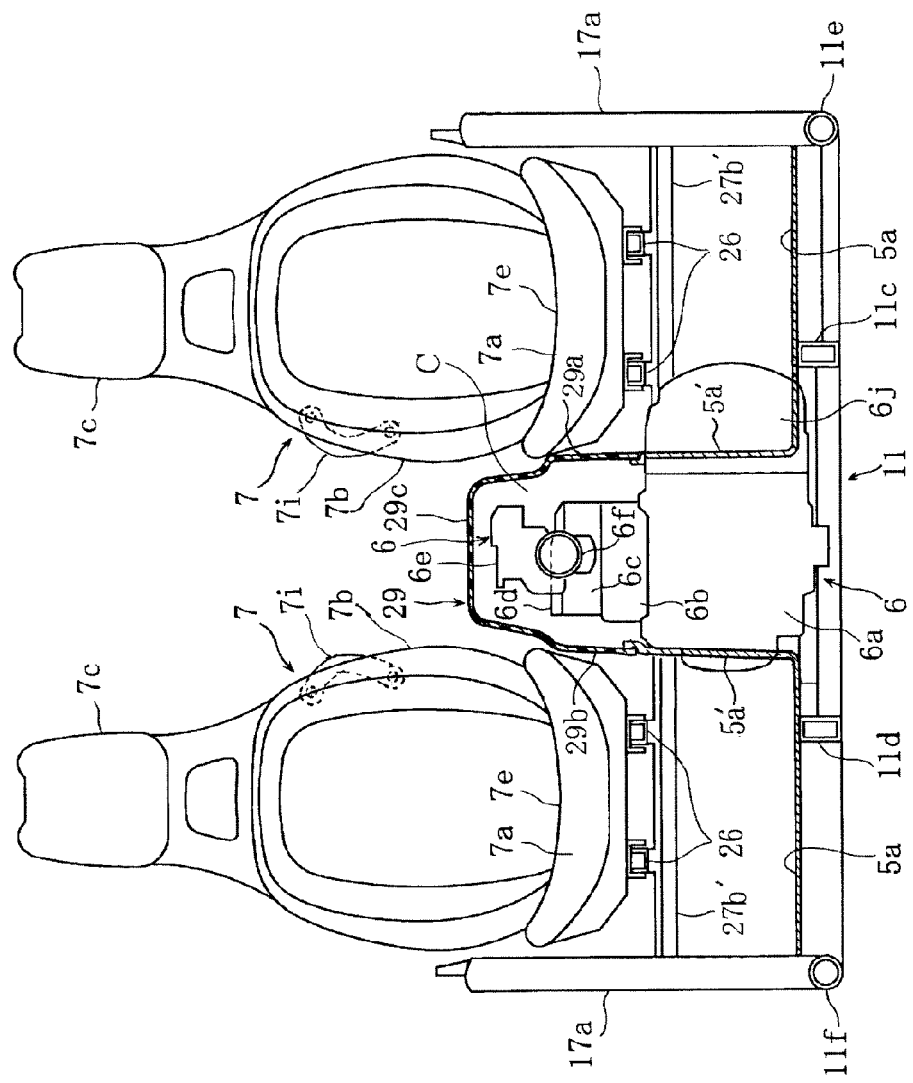
FIG. 5 is a cross-sectional diagram along the section V-V in FIG. 3, illustrating the relationship between the dispositions of the seats, the center console, and the engine.

Additionally, as illustrated in FIG. 5, the portions of the left and right side walls 29a and 29b of the center console 29 that are further forward from the front seat 7 are connected to the extension portions 5a' of the front floor 5a. The left and right extension portions 5a' structure a portion of the left and right side walls of the portion of the center console 29 that is forward of the front seat 7. Note that in the portion of the center console 29 that is between the left and right front seats 7 and 7, there is no portion corresponding to the extension portion, and thus the interior space C communicates with the space D below the left and right front seats 7 and 7. In the present embodiment, the left and right side walls of the center console forward of the front seat 7 are formed independently using the extension portion 5a'; however, they may instead be formed integrally with the left and right side walls 29a and 29b. Additionally, when it comes to the portion to the rear of the front seat 7, an extension portion of the rear floor 9 similarly rises upwards, and is connected to the left and right side walls 29a and 29b.

Consequently, the left and right side walls of the portions of the center console 29 that are forward from the front seat and are to the rear of the front seat are formed so as to be longer in the vertical direction than the left and right side walls of the center console 29 between the front seats 7 and 7.

Figure 6:
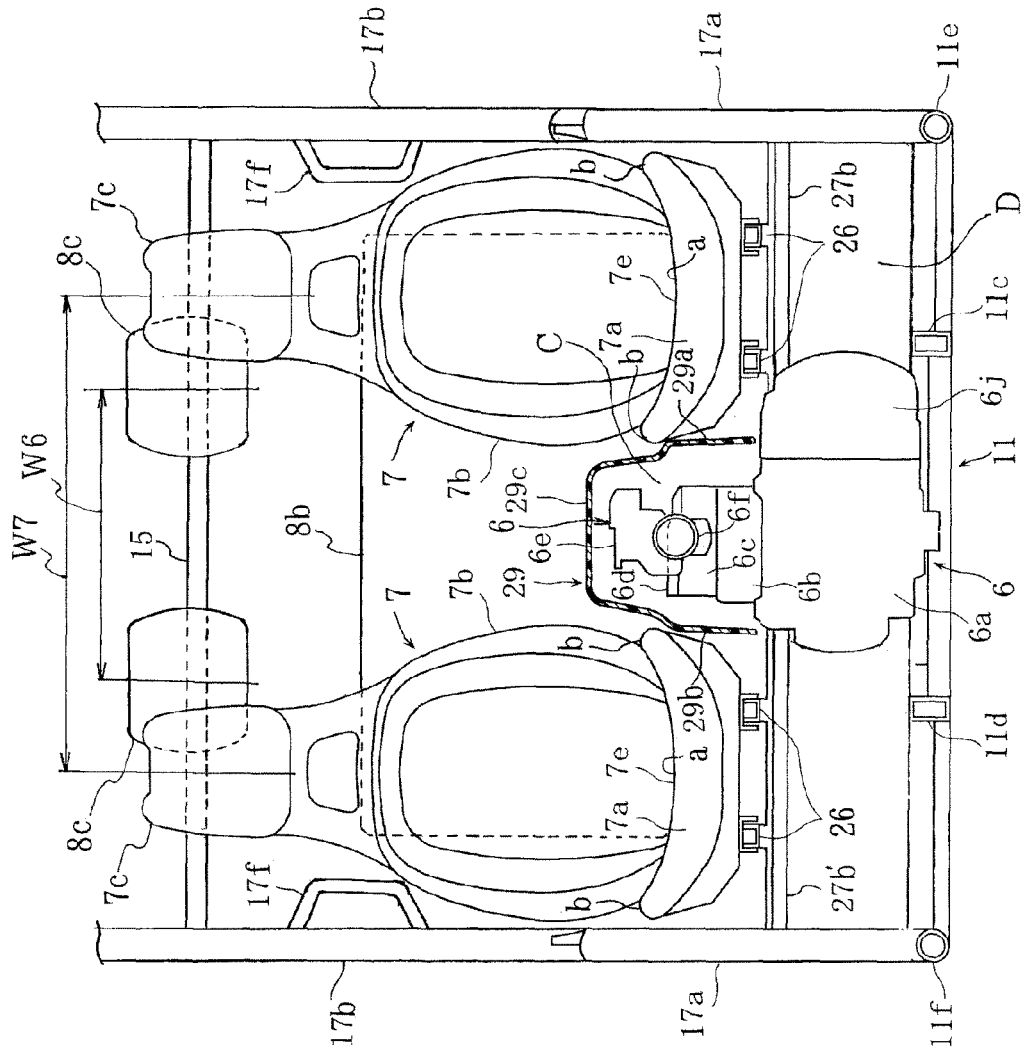
FIG. 6 is a cross-sectional diagram along the section VI-VI in FIG. 3, illustrating the relationships between the dispositions of the seats, the center console, and the engine.
Figure 7:
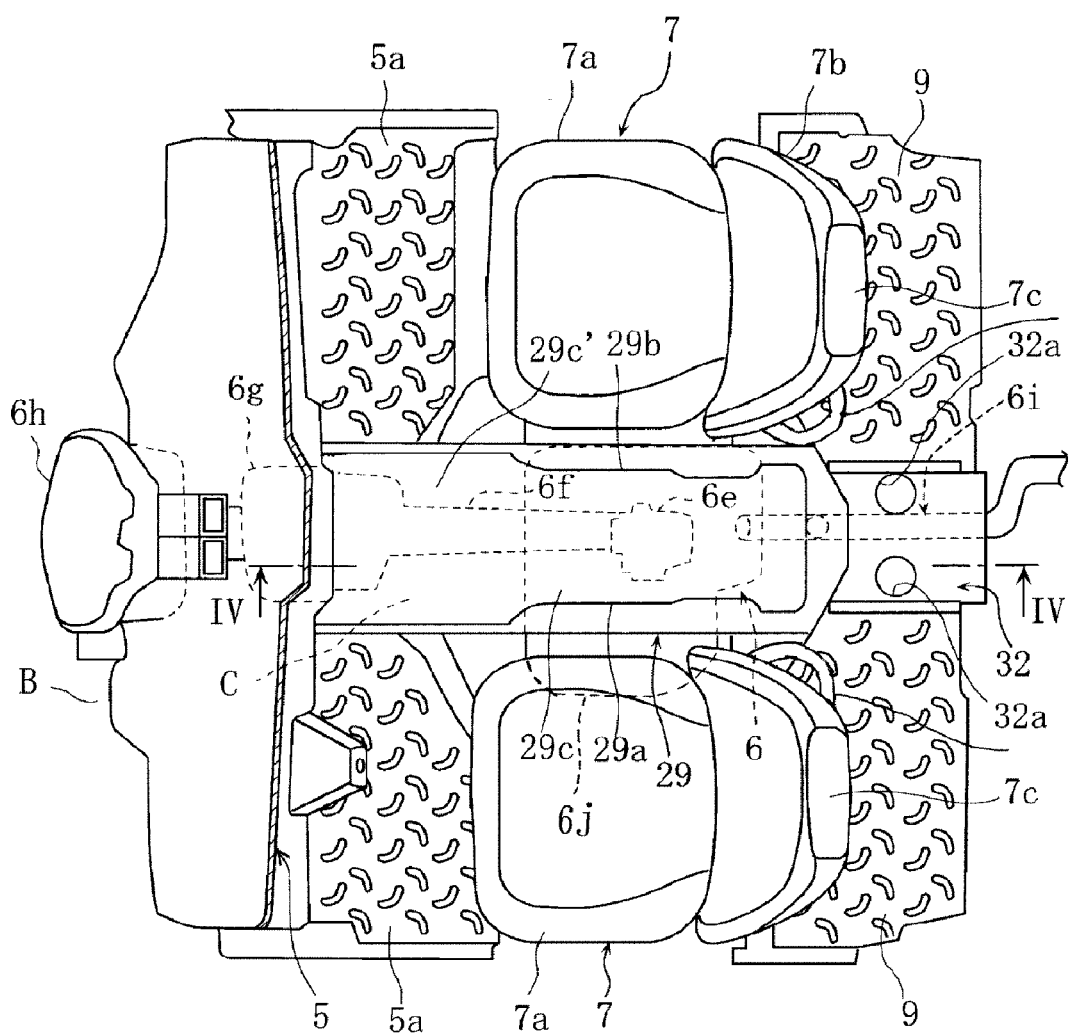
FIG. 7 is a plan view illustrating the relationships between the dispositions of the floor, the seats, and the center console.
Figure 8:
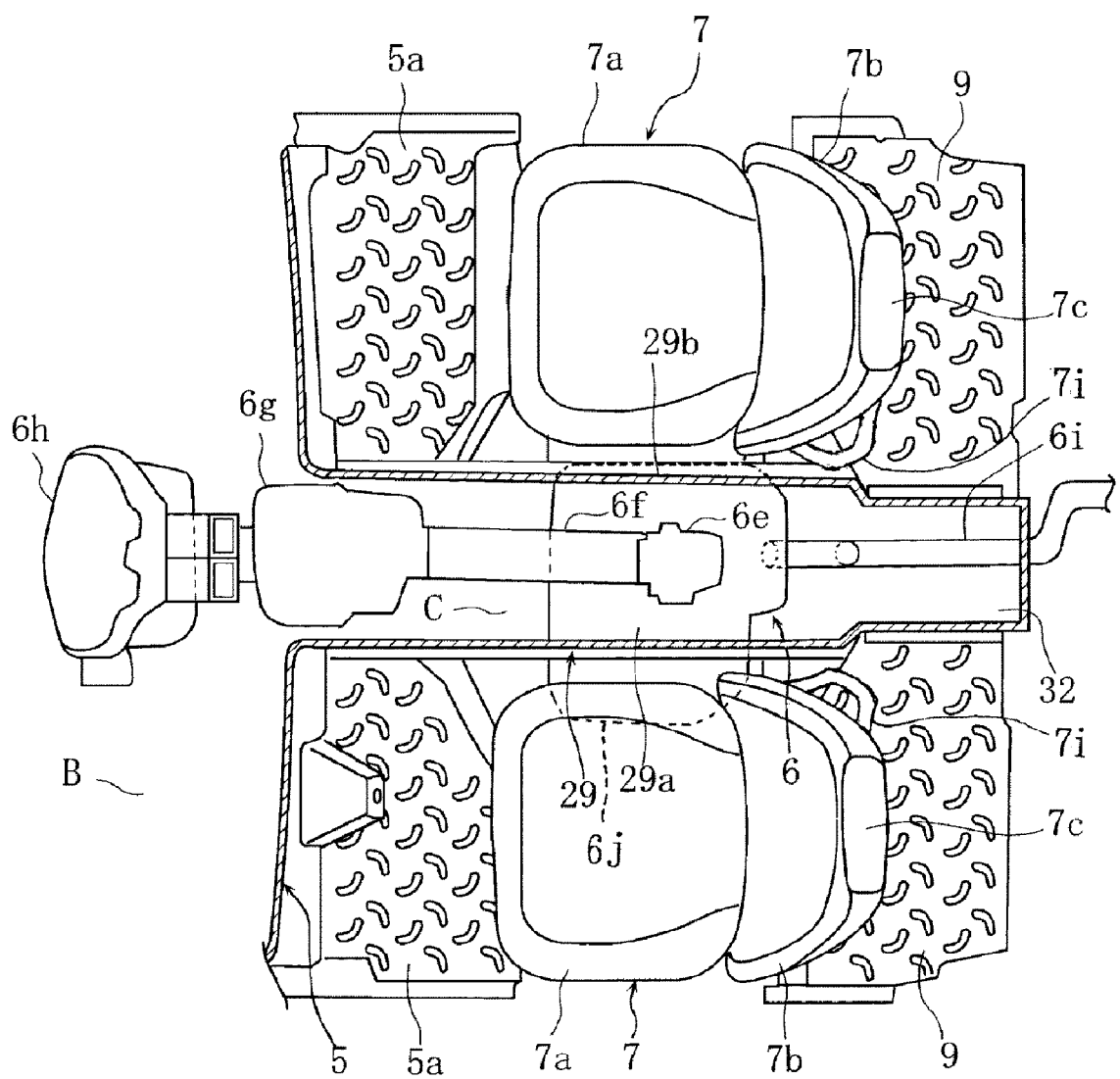
FIG. 8 is a cross-sectional diagram along the section VIII-VIII in FIG. 3, illustrating the relationships between the dispositions of the floor, the seats, and the center console.
Figure 9:
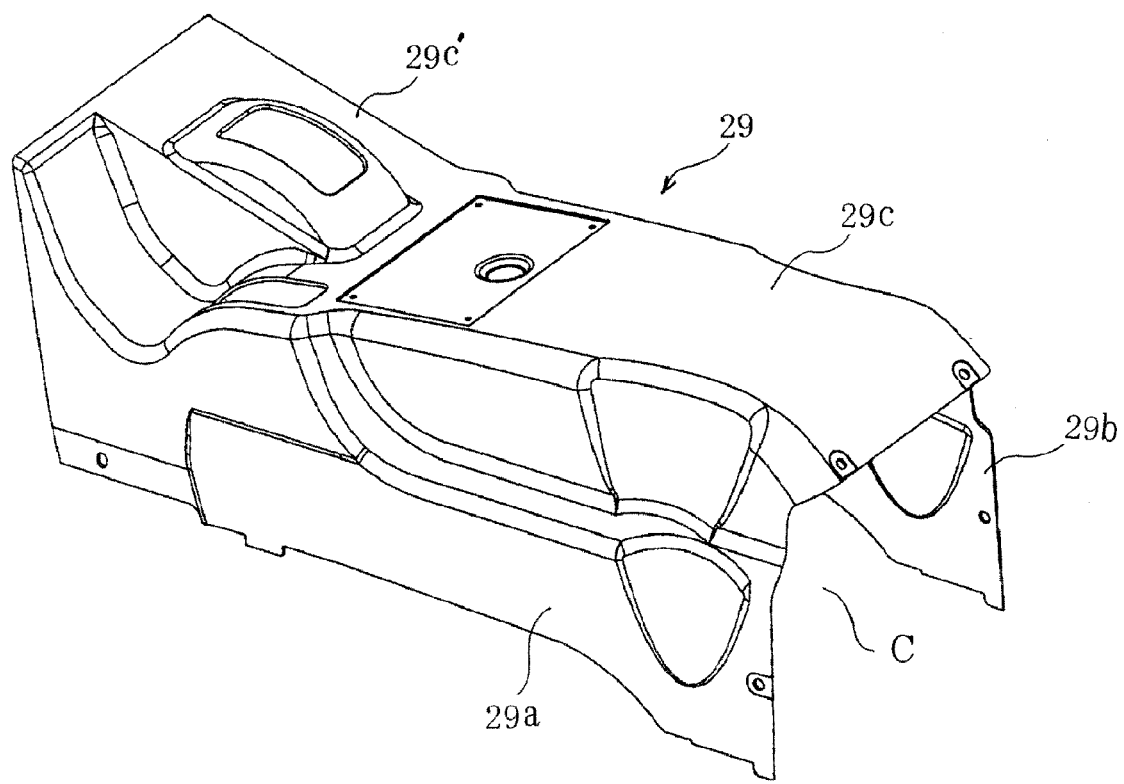
FIG. 9 is an oblique view of the center console.
Figure 10:
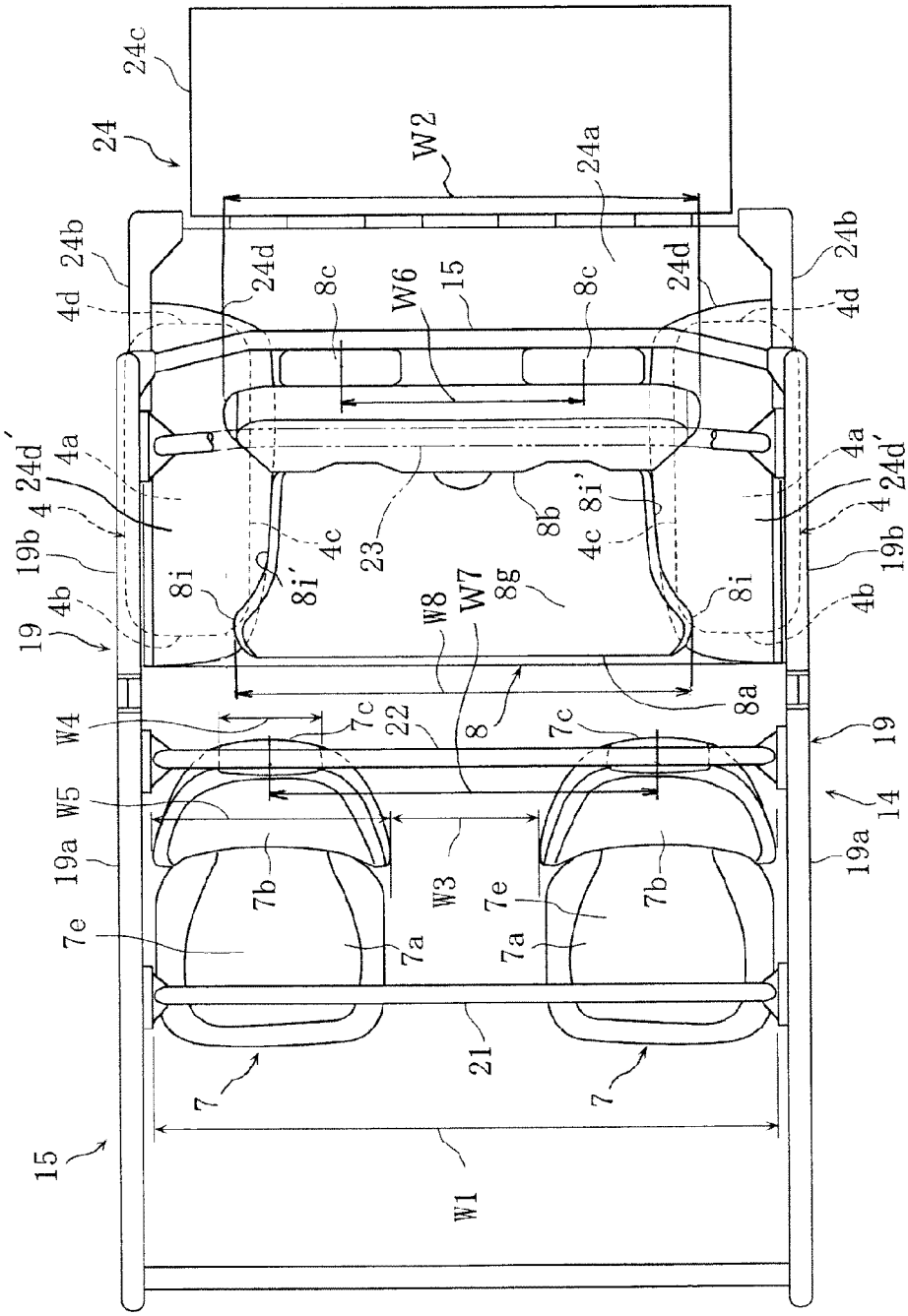
FIG. 10 is a plan view illustrating the relationships between the front seats and the rear seat.
Figure 11:
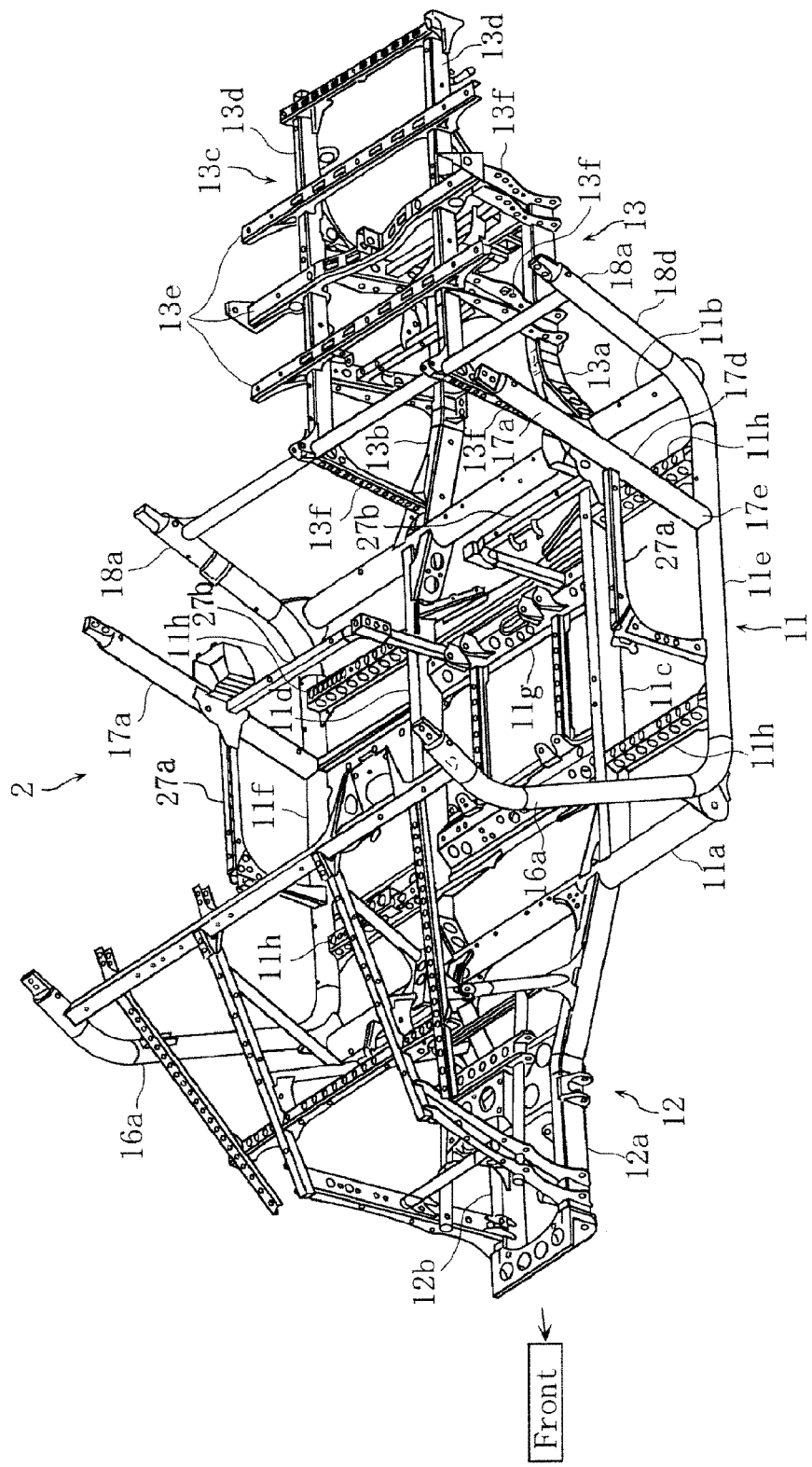
FIG. 11 is an oblique view illustrating the vehicle body frame and the bottom portions of the roof supports.
Figure 12:
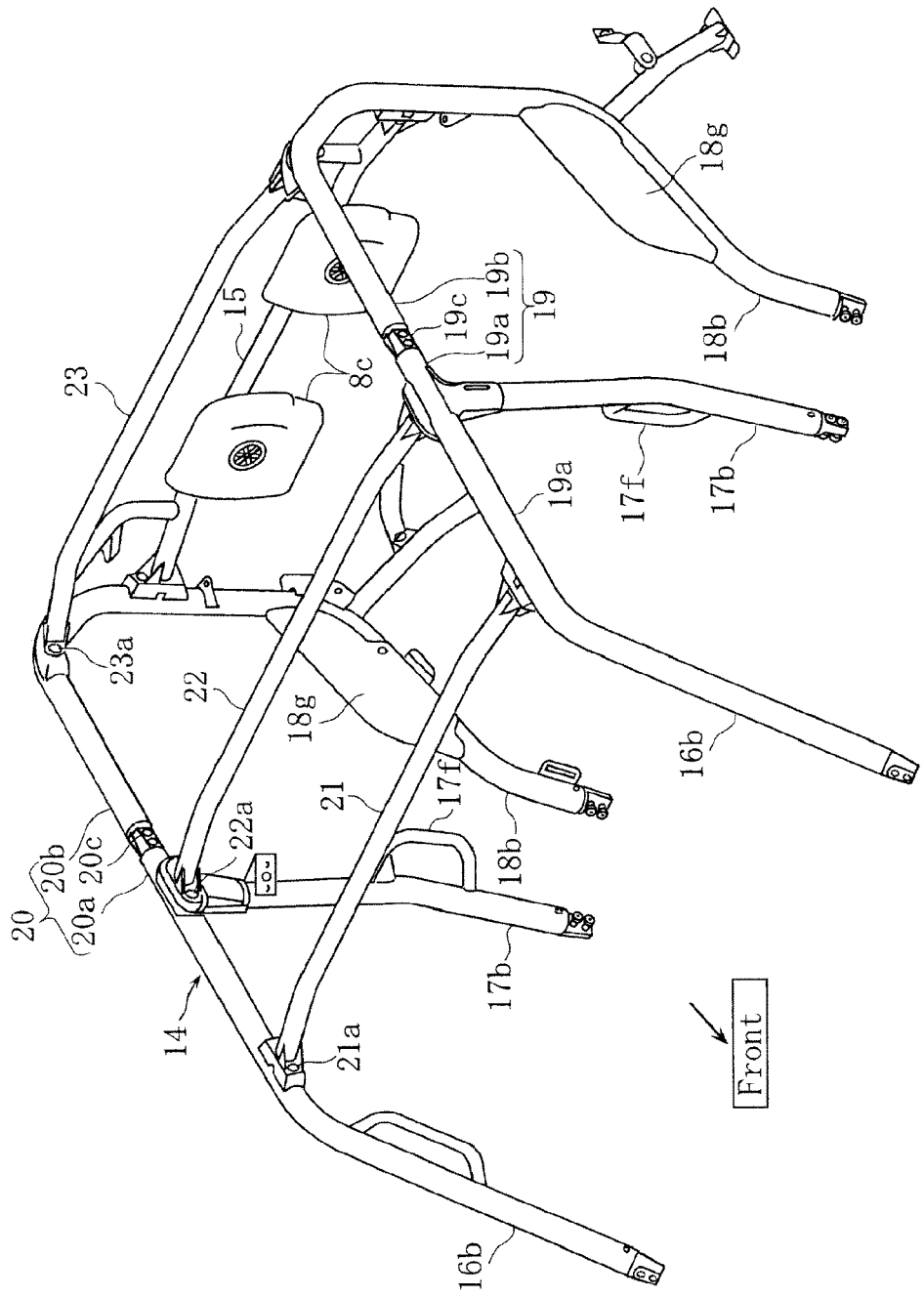
FIG. 12 is an oblique view illustrating the top portions of the roof supports and the roof member.
Figure 13:
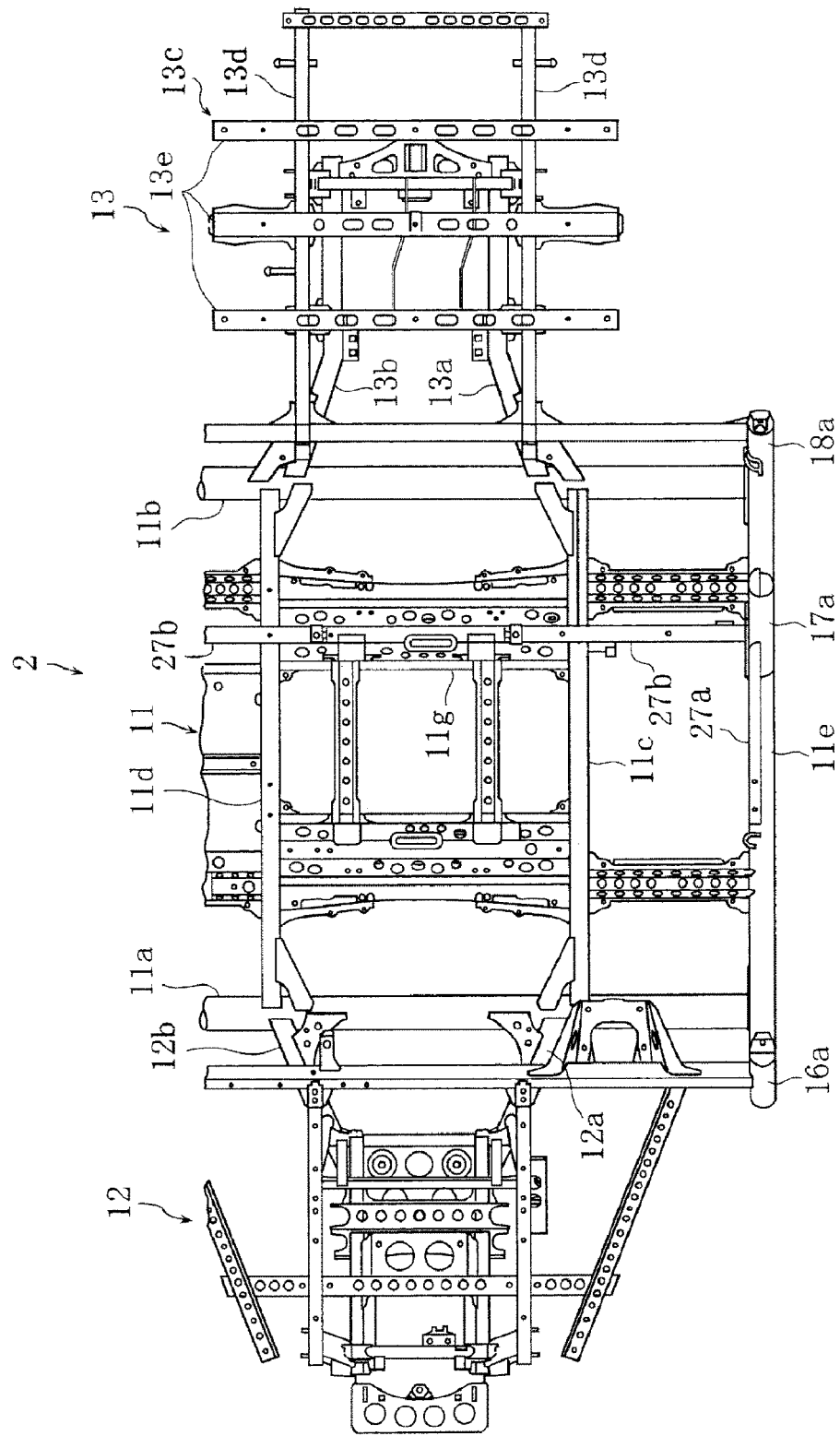
FIG. 13 is a plan view of the vehicle body frame and the roof support lower portion.
Figure 14:
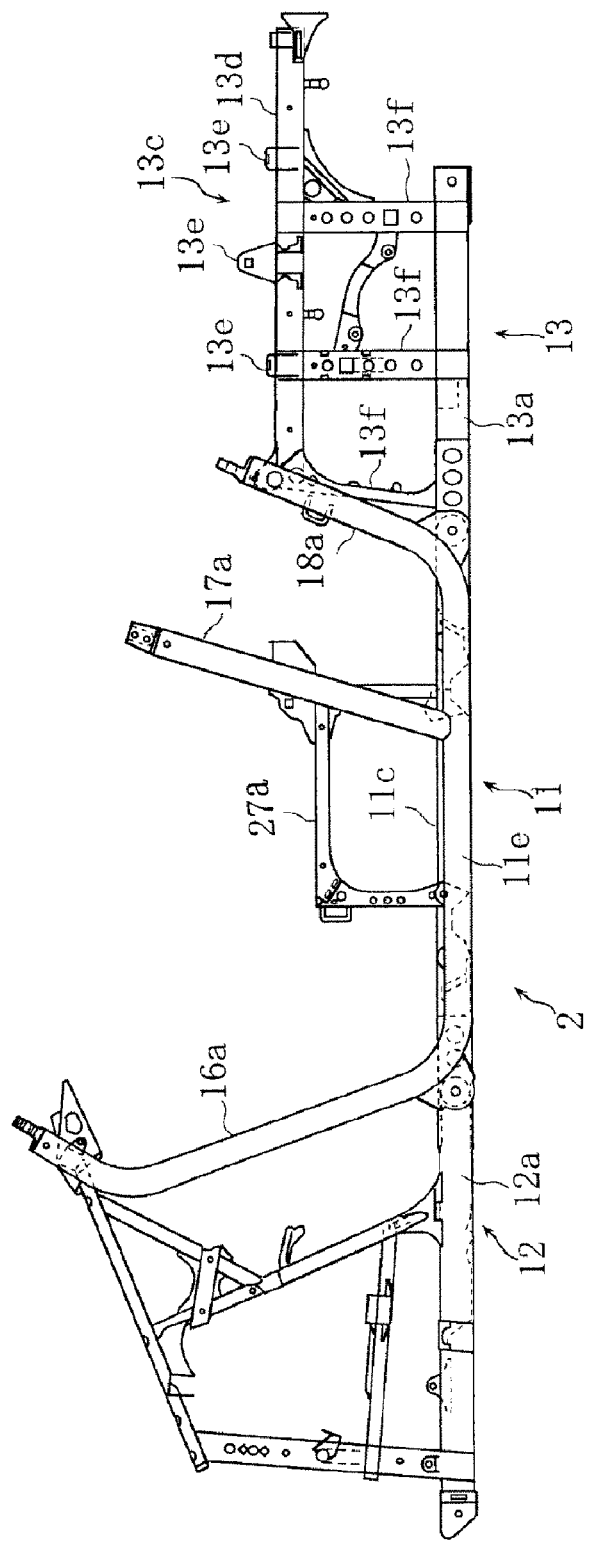
FIG. 14 is a left side view of the vehicle body frame and the roof support lower portion.
Figure 15:
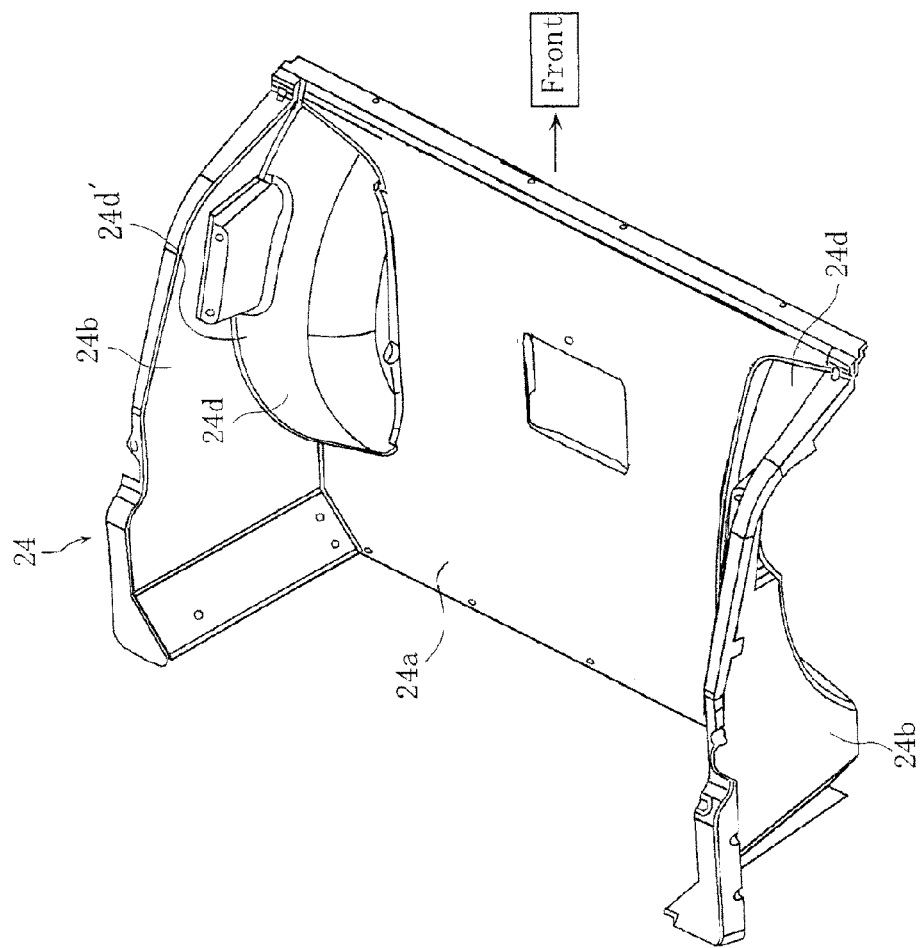
FIG. 15 is an oblique view of a cargo bed.
Figure 16:
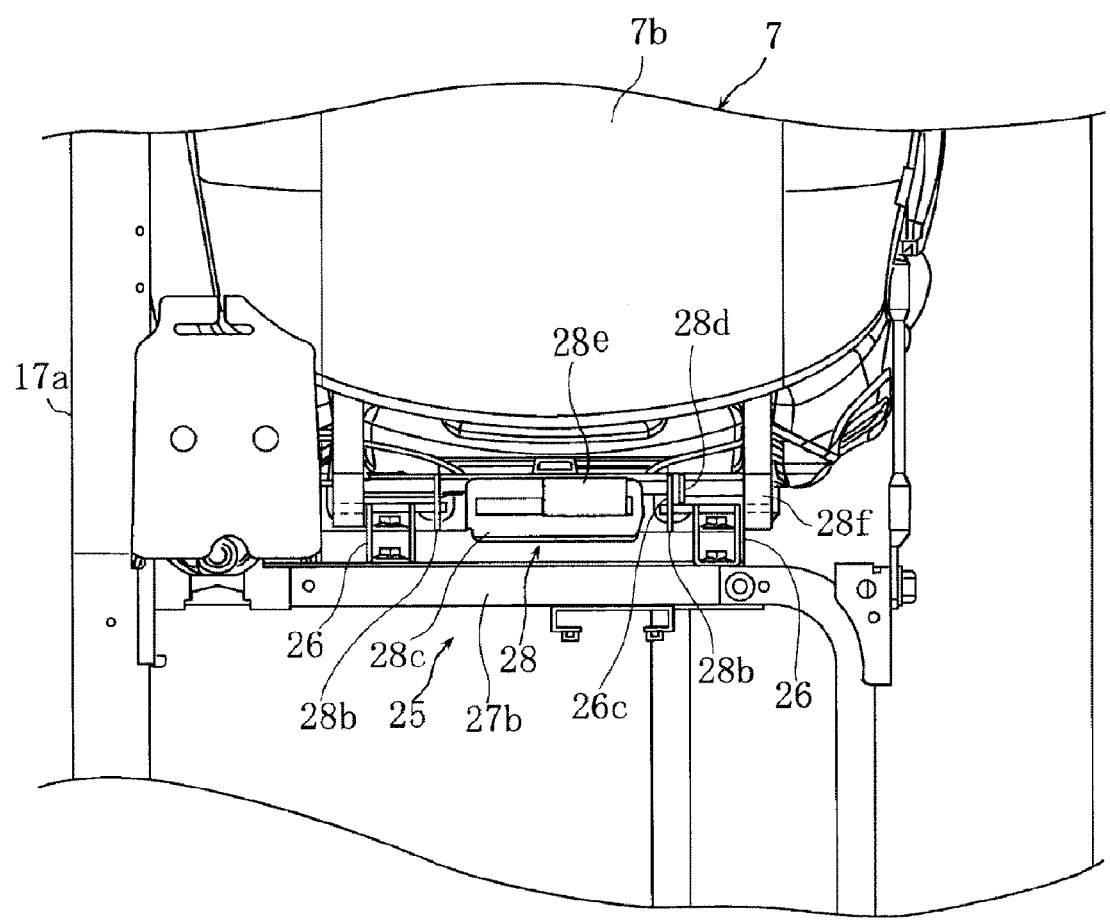
FIG. 16 is a back view of the bottom portion of the front seat.
Figure 17:
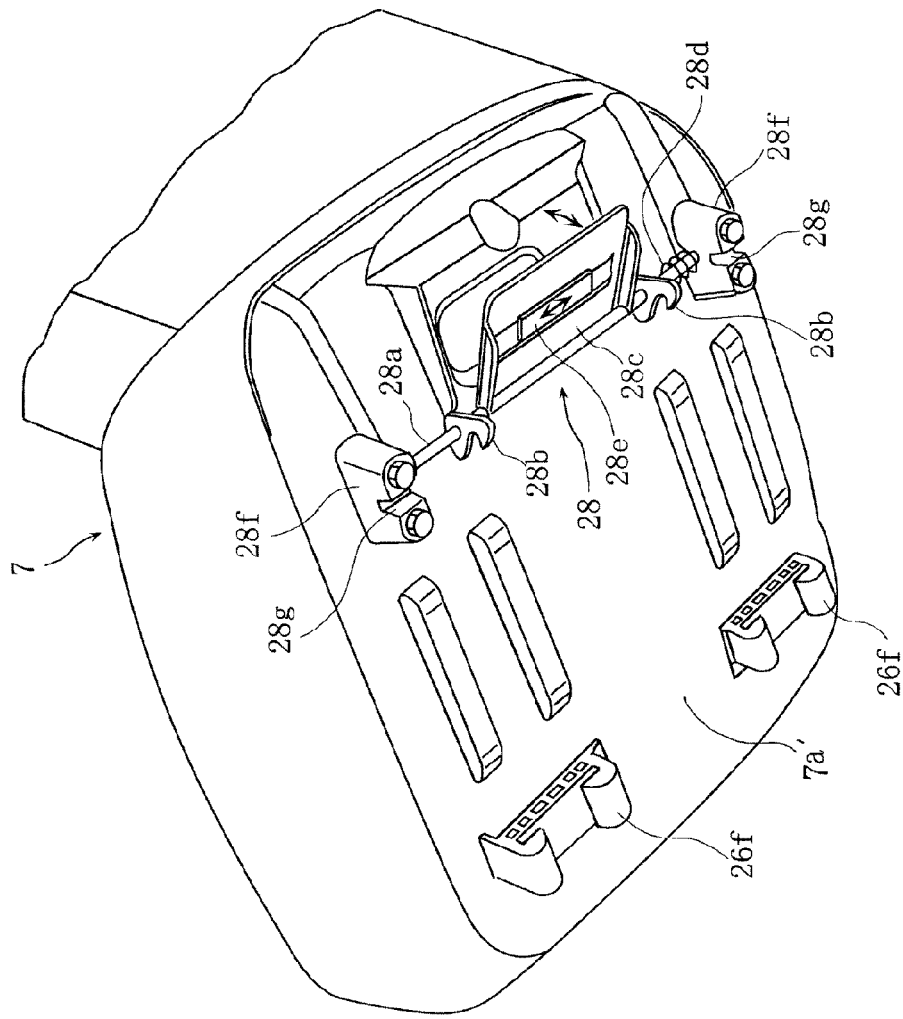
FIG. 17 is an oblique view of the bottom portion of the front seat.
Figure 18:
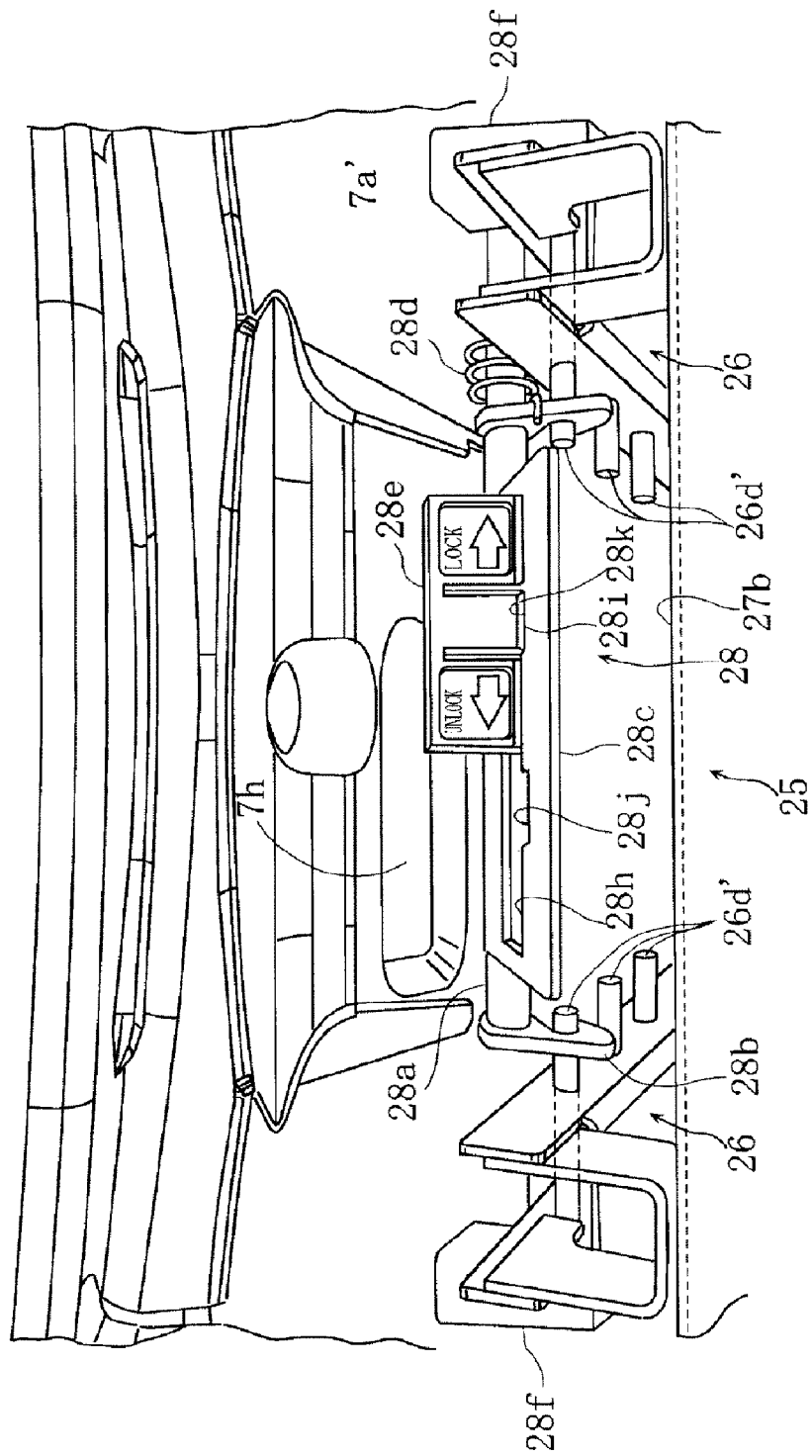
FIG. 18 is a back view of the bottom portion of the front seat.
Figure 19:
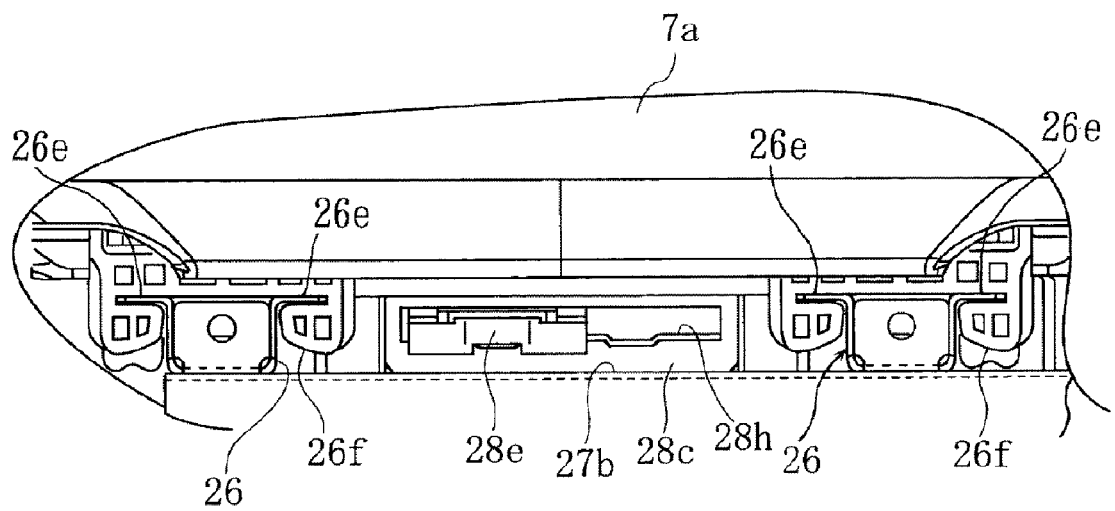
FIG. 19 is a front view of the bottom portion of the front seat.
Figure 20:
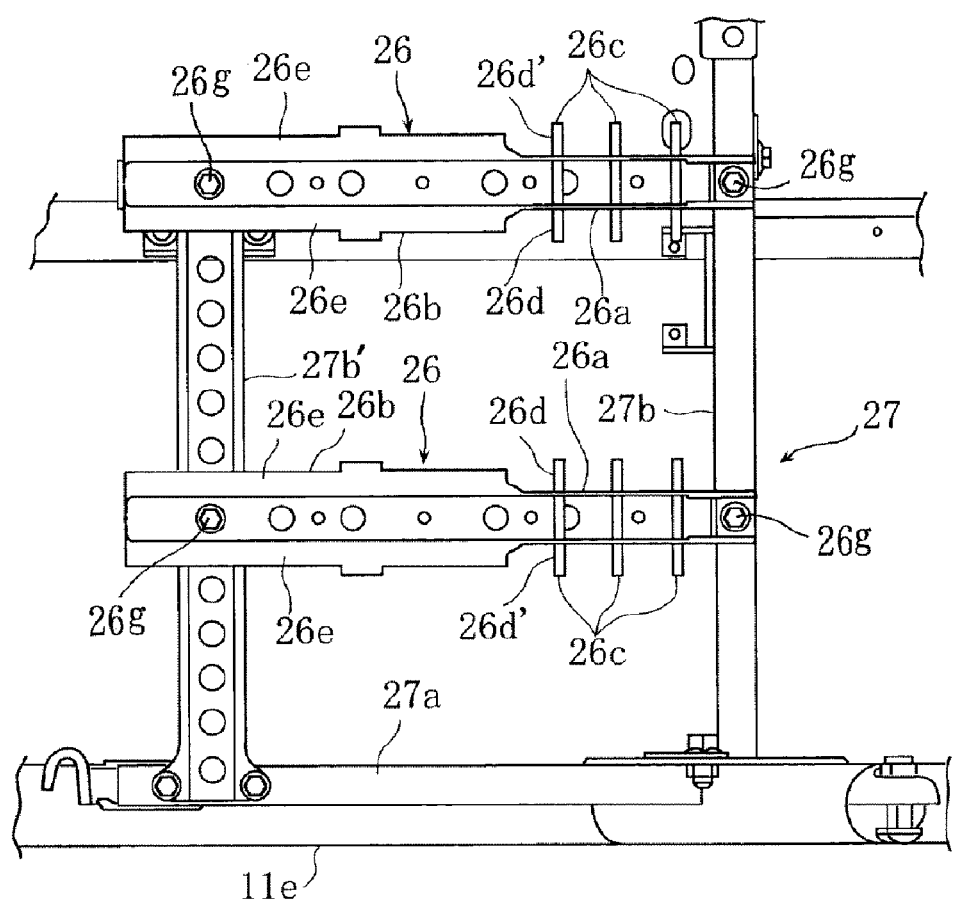
FIG. 20 is a plan view of a seat rail member and a seat bracket.
Figure 21:
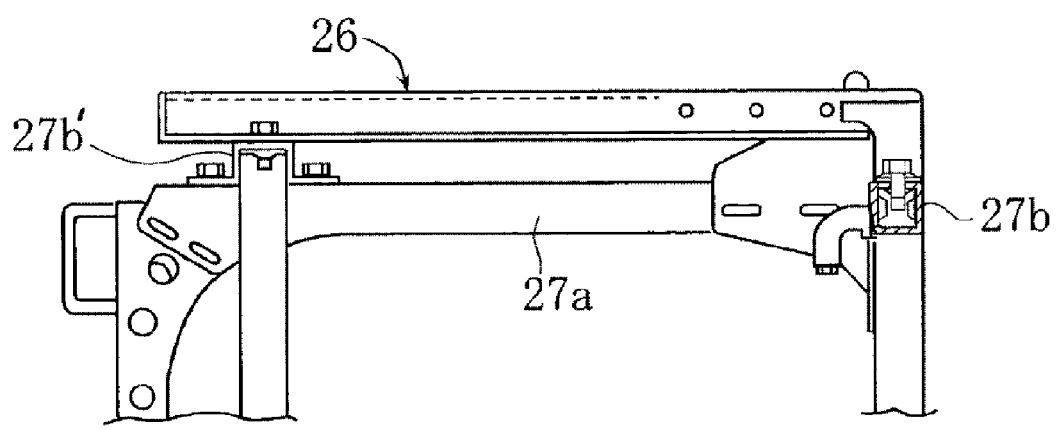
FIG. 21 is a left side view of the seat rail member and the seat bracket.
Figure 22:
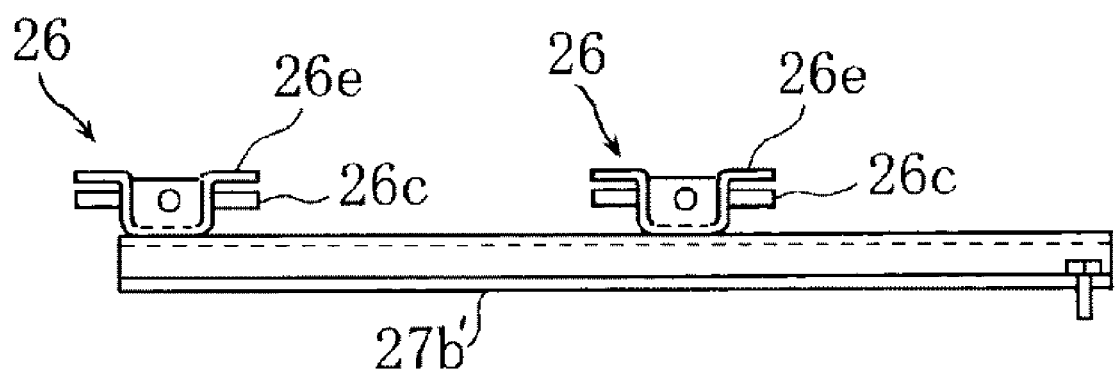
FIG. 22 is a front view of the seat rail member and the seat bracket.

Furthermore, the top wall 29c of the center console 29 is positioned at a position that is higher than the center portion (the bottom edge) a as shown in FIG. 6, and the left and right edge portions (top edges) b, in the direction of width of the vehicle, of the seating surface 7e of the seat cushion portion 7a of the front seat 7, and positioned at a position that is lower than the top end 5b of the front panel 5.

Figure 3:
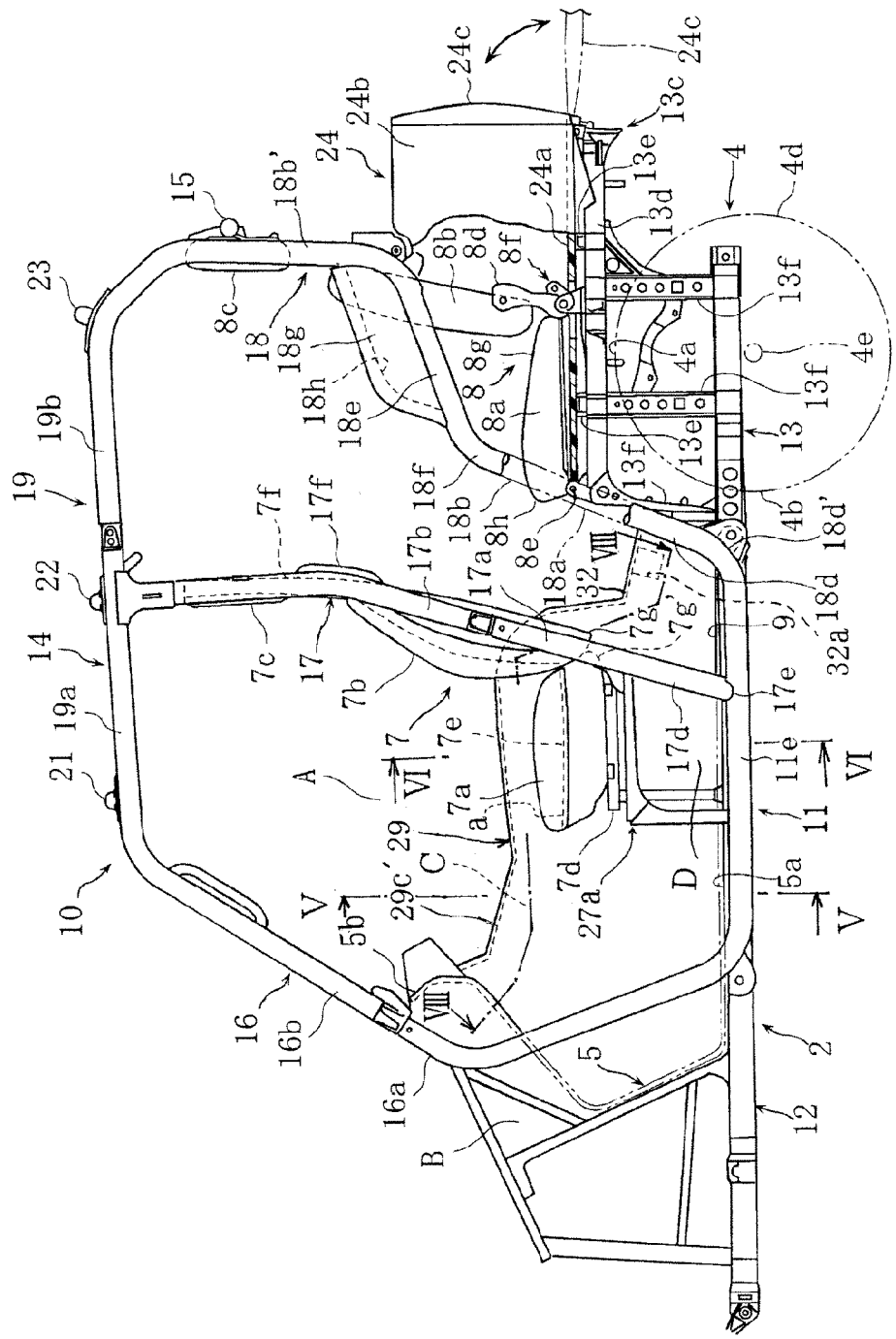
FIG. 3 is a left side view illustrating the vehicle body frame, the roof support, the roof member, and the seats.
Figure 4:
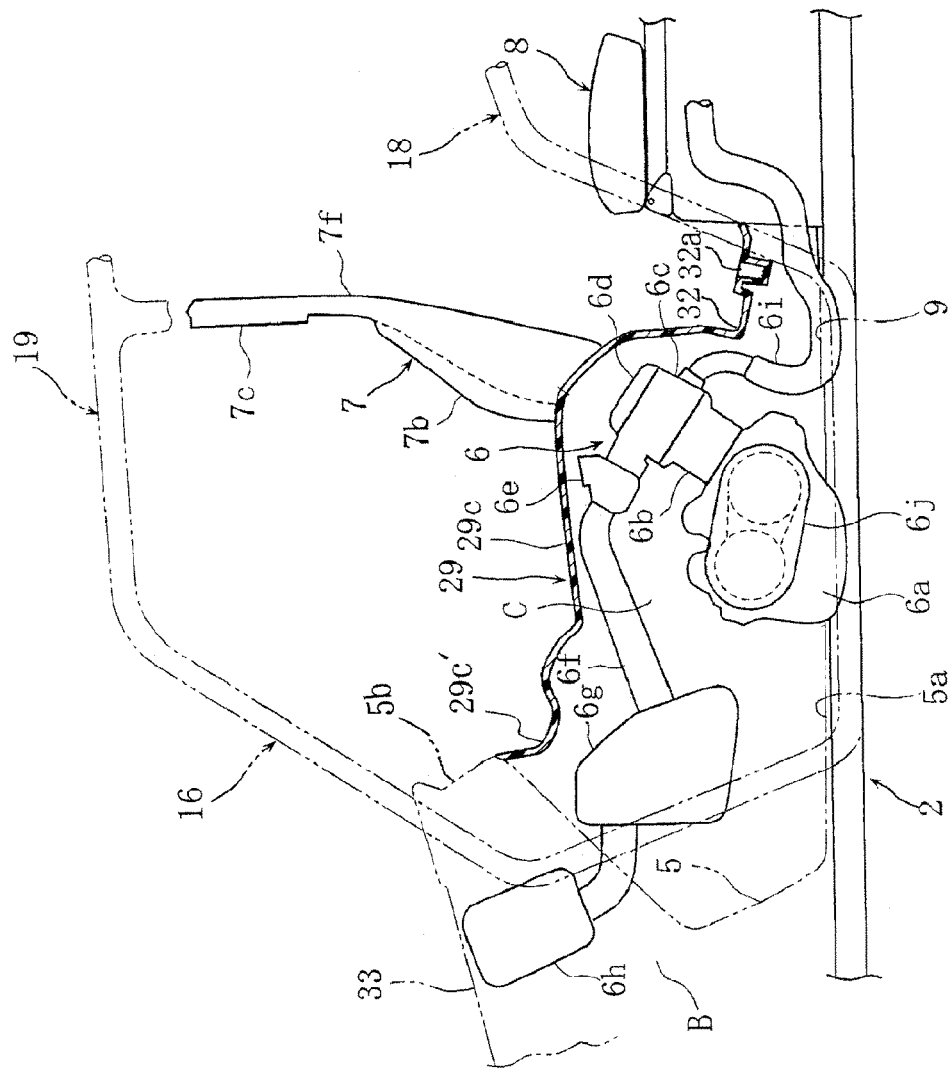
FIG. 4 is a cross-sectional diagram along the section IV-IV in FIG. 7, illustrating the relationships between the center console and the engine unit.

As shown in FIG. 3, the interior space C of the center console 29 communicates with the space B which is defined by a front frame carried by frame 12. Space B is covered by a hood 33, so as to be able to open and close, forward of the front panel 5. Furthermore, the interior space C of the center console 29 communicates with the space D below the left and right front seats 7 and 7. This open communication provides for strategic placement of engine 6 and it's related components. The interior space C extends behind the front seats providing for passage of exhaust components from engine 6. The throttle body 6e that is connected to the engine unit 6, the vacuum pipe 6f, and the surge tank 6g are disposed within this interior space C, and the air cleaner 6h is disposed within the interior space B.

The portion of the top wall 29c of the center console 29 that is to the rear of the front panel 5 and that is forward of the front seat 7 is an inclined wall 29c', that is inclined at an angle that is upwards towards the front, so as to be higher further towards the front. Controls that are operated by the operator, specifically a high/low switching lever 31a of the transmission and a hand brake lever 31b are disposed on the inclined wall 29c'. Note that 30 is a steering wheel.

Additionally, at the back end portion of the center console 29, a rear tunnel portion 32 is formed so as to be continuous with the center console 29. This rear tunnel portion 32 is positioned in a position that is to the rear of the front seat 7, and that is lower than the seating surface 7e of the front seat 7. A cup holder 32a for the rear seat passenger is formed in the rear tunnel portion 32, and the bottom portion of this rear tunnel portion 32 extends to, or to the rear of, the exhaust pipe 6i. Moreover, the top wall of the rear tunnel portion 32 extends in the vertical direction, and connects to the back ends of the top wall 29c and the left walls 29a and 29b of the center console 29. That is, the rear wall of the center console 29 is formed through the top wall of the rear total portion 32 extending upward.

The front frame 12 comprises left and right front main pipes 12a and 12b that extend rearward from the portion wherein connects the left and right center main pipes 11c and 11d of the cross pipe 11a. These left and right front main pipes 12a and 12b extend angled towards the inside from the connecting portion, and then extend rearward in parallel with the center line of the vehicle. Front wheels 3 are supported, via front arms, on this portion that extends in parallel, so as to be able to sway freely.

The rear frame 13 has left and right rear main pipes 13a and 13b that extend to the rear from the portion that wherein the left and right center main pipes 11c and 11d of the cross pipe 11b are connected, and a cargo bed frame 13c that is disposed above the rear main pipes 13a and 13b.

The left and right rear main pipes 13a and 13b extend angled towards the inside towards the back from the connecting portion, and then extend further towards the rear in parallel with the center line of the vehicle. The rear wheels 4 are supported, via a rear arm, on the portion that extends rearward, so as to be able to sway freely up and down.

Additionally, the cargo bed frame 13c is formed through the connection of the rear main pipes 13a and 13b, left and right lengthwise frames 13d and 13d that extend in parallel, and a plurality of cross frames 13e that extend in the direction of width of the vehicle, when viewed from the side of the vehicle. Given this, the cargo bed frame 13c is secured so as to be positioned above the rear main pipes 13a and 13b through a plurality of leg members 13f.

Additionally, a cargo bed 24 made from plastic is positioned on the cargo bed frame 13c. This cargo bed 24 comprises a bottom wall portion 24a that is placed on top of the cargo bed frame 13c, left and right side wall portions 24b and 24b that are formed integrally so as to rise upwards from the left and right edge portions of the bottom wall portion 24a, and a door 24c that structures the back wall, and is open in the forward and upward directions. The seat back 8b of the rear seat 8 is positioned at the front portion of the cargo bed 24, and the seat back 8b functions as the front wall of the cargo bed 24.

Additionally, at the left and right side portions of the bottom wall portion 24a, tire housings 24d are provided so as to bulge to the rear from the bottom wall portion 24a and so as to bulge towards the interior, in the direction of width of the vehicle, from the side wall portions 24b and 24b.

The front seat 7 is of a so-called bucket type wherein the left and the right are separate, and the seat cushion and backrest are structured as a single unit. The left and right front seats 7 and 7 each have their respective seat cushion portions 7a, backrest portions 7b that rise up in the upward direction from the back end portions of the seat cushion portions 7a, and headrest portions 7c that are formed at the upper end portion of the backrest portions 7b.

The seat cushion portion 7a and the backrest portion 7b are rigidly connected by a bracket 7g so that the backrest portion 7b is able to maintain the standing orientation against the body mass of the passenger. On the other hand, the headrest portion 7c is formed integrally with the backrest portion 7b.

Grips 7i to be grasped by the passengers in the rear seat 8 are formed at the inner edge portions, in the direction of width of the vehicle, of the back surfaces of the backrest portions 7b of both the left and right front seats 7 and 7.

Here the left and right front seats 7 and 7 are disposed so as to leave a gap W3 between the seat cushion portions 7a and 7a wherein the engine unit 6 may be disposed. The width W4, in the direction of width of the vehicle, of the headrest portion 7c is formed so as to be narrower than the width W5, in the direction of width of the vehicle, of the backrest portion 7b.

Additionally, the front seat 7 is supported by the center frame in 11 via a forward/backward position adjusting mechanism 25 wherein the position in the front/back direction of the vehicle can be adjusted, and wherein the adjusted position can be locked.

The forward/backward position adjusting mechanism 25 comprises: a pair of left and right slide rails 26 and 26 that support the seat cushion portion 7a so as to be able to slide in the front/back direction of the vehicle; a seat bracket 27 that supports the slide rail 26 rigidly on the center frame 11; and a locking mechanism 28 for locking the seat cushion portion 7a in a specific position.

The seat bracket 27 comprises a lengthwise bracket 27a that extends in the front/back direction of the vehicle, and front and rear crosswise brackets 27b' and 27b that extend in the direction of width of the vehicle.

The left and right slide rails 26 and 26 are disposed so as to bridge between the front and back cross brackets 27b' and 27b, and are fastened to the front and back cross brackets 27b' and 27b by bolts 26g.

Additionally, the slide rails 26 have rear portions 26a and forward portions 26b that are U-shaped in their cross sections, and are attached to the seat brackets 27 so that the openings thereof are facing upwards. In the rear portions 26a are disposed locking pins (rod-shaped members) 26c so as to pass through in the direction of width of the vehicle. These locking pins 26c protrude towards the inside and towards the outside, in the direction of width of the vehicle, from the rear portions 26a of the slide rails 26.

On the open edge portions of the forward portions 26b of the slide rails 26, slide flange portions 26e, for supporting the front seat 7 slidably, are formed by bending towards the inside and the outside. These slide flange portions 26e are held slidably by guide members 28f that are attached to the bottom surface of the front seat 7.

The locking mechanism 28 comprises: a rotating rod 28a disposed so as to be able to rotate at the bottom surface 7a' of the seat cushion portion 7a; a pair of left and right locking pawls (locking members) 28b, rigidly attached to the rotating rod 28a, that can interlock removably with the locking pins 26c; and a latch 28c, rigidly attached to the rotation rod 28a, so as to enable the rotating rod 28a to be rotated by a hand motion.

The latch 28c is provided with an operating portion 28e to enable or disable the rotation of the latch 28c. This operating portion 28e is disposed so as to be able to slide in the direction of width of the vehicle along a slide groove 28h that is formed in the latch 28c. A locking piece 28i on the operating portion 28e is able to lock to and unlock from a locking indentation portion 28j, which is formed in the position wherein the slide mechanism 28h can be unlocked, and a locking indentation portion 28k which is formed in a position that prevents unlocking.

Furthermore, an indentation portion 7h for allowing the rotation of the operating portion 28e is also provided at the bottom surface 7a' of the seat cushion portion 7a. When the locking pawl 28b is unlocked, then the interlock of the locking piece 28i with the locking indentation portion 28k is undone by pushing this locking piece 28i forward, and the operating portion 28e moves to the unlocked side. In this state, rotating the latch 28c upward causes the operating portion 28e to enter into the indentation portion 7h, performing the unlocking operation. On other hand, when the operating portion 28e is moved to the locking site, then the operating portion 28e is blocked by the bottom surface 7a' of the seat cushion portion 7a, and so the latch 28c cannot be rotated, and thus the locked state is maintained.

In this way, an unlocking preventing mechanism, for preventing the rotation of the latch 28c to the unlocked side, is structured from the operating portion 28e, the indentation portion 7h, and so forth.

The rear seat 8 is of the so-called bench type, and comprises: a single seat cushion portion 8a that extends in the direction of width of the vehicle so as to be able to seat both the left and the right passenger; a single backrest portion 8b that, similarly, extends in the direction of width of the vehicle so as to be able to support the backs of both the left and the right passengers; and headrest portions 8c and 8c, which are formed independently on the left and the right.

The backrest portion 8b is disposed so as to overlap, from above, the back edge portion of the seat cushion portion 8a, and is attached so as to be able to rotate forward via a bracket 8d at the back edge portion thereof.

The seat cushion portion 8a of the rear seat 8, is disposed at a position that, when viewed from above, is between the left and right tire housings 24d and 24d. Precisely, the left and right edge portions 8i and 8i of the seat cushion portion 8a are disposed so as to overlap the tire housings 24d. Furthermore, the portion 8i', which is the seat cushion portion 8a excluding the left and right edge portions 8i, is positioned towards the inside, in the direction of width of the vehicle, from the interior edge portion 4c of the tire housings 24d, and, by extension, from the rear wheels 4.

The headrest portions 8c are separate from the backrest portion 8b in the upward direction. The headrest portion 8c is attached to a rear cross pipe 15, described below.

The front portion of the bottom surface of the seat cushion portion 8a is supported so as to be able to rotate to the front or to the rear by a rotating shaft 8e at the front edge portion of the cargo bed frame 13c. The rear edge portion of the seat cushion portion 8a is provided with a rear seat lock member 8f that locks and unlocks rear seat 8 from the cargo bed frame 13c.

Here the width dimension W2, in the direction of width of the vehicle, of the outside edges of both the left and the right of the backrest portion 8b of the rear seat 8 is set so as to be smaller than the width dimension W1, in the direction of width of the vehicle, of the left and right front seats 7 and 7. Additionally, the headrest portions 8c and 8c of the rear seat 8 are disposed so that the gap W6, in the direction of width of the vehicle, is narrower than the gap W7, in the direction of width of the vehicle, of the headrest portions 7c and 7c of the front seat 7, and are thus disposed further towards the interior, in the direction of width of the vehicle.

Additionally, the width dimension W8, in the direction of width of the vehicle, of the seating surface 8g upon which the passenger is seated, in the rear seat 8 is set to be smaller than the width dimension W1, in the direction of width of the vehicle, of the left and right front seats 7 and 7, and smaller than the width dimension W2, in the direction of width of the vehicle, of the backrest portion 8b of the rear seat 8. Additionally, the seating surface 8g is disposed in a position that is lower than the top edge 24d' of the tire housings 24d. Furthermore, the seating surface 8g in the present embodiment means the portion whereon the passenger can sit without obstruction. For example, it would be difficult to sit if [the seating surface 8g] were provided all the way to the top surfaces of the tire housings 24d. That is, the tire housings 24d are formed so as to be higher the further towards the outside, in the direction of width of the vehicle, so that merely extending the seating surface to the outside on the left and the right would not cause it to function as a seating surface because it would be difficult to sit upon the extended portion on the tire housing.

Because, in this way, the width dimension W8 of the seating surface 8g of the rear seat 8 is set so as to be narrower than the width dimension W1 of the front seat 7, the passenger in the rear seat 8 will sit in a position that is shifted towards the center of the vehicle from the passenger in the front seat 7. In addition, the front seats 7 and 7 are split into the left and the right, and a gap W3, wherein the engine unit 6 may be disposed, is opened between them. Because of this, the passenger seated in the rear seat 8 is able to secure an adequate field of view in the forward direction of the automobile between the left and right front seats 7 and 7.

Additionally, because the width, in the direction of width of the vehicle, of the backrest portion 8b is wider than the width, in the direction of width of the vehicle, of the back portion of the seating surface 8g of the rear seat 8, which is the position of the buttocks of the passengers, the width of the seating surface 8g is made more compact, and when the passengers are seated, the shoulders and arms of the passengers, which are positioned further to the outside than the buttocks, can be supported, improving the level of comfort for the passengers.

The cabin structuring member 10 comprises: front roof supports (first roof supports) 16, provided on the left and right side portions of the center frame 11; center roof supports (second roof supports) 17; rear roof supports (third roof supports) 18; and a roof member 14 that connects the top portions of the top, center and rear roof supports 16, 17, and 18. A cabin with a feeling of openness is structured from this cabin structuring member 10.

The front roof supports 16 are disposed on the front edge portions on the left and right side portions of the center frame 11, and, more specifically, are structured from a pair of left and right round pipes that extend upwards from the front edge portion of the left and right side pipes 11e and 11f. Additionally, the front roof supports 16 are divided into lower portions 16a and upper portions 16b, and are connected via a plurality of bolts 16c that penetrate through in the forward/backward direction of the vehicle.

The center roof supports 17 are provided in the center portion, in the front/back direction, at the left and right side portions of the center frame 11, further towards the rear, in the front/back direction of the vehicle, from the front roof supports 16, and, more specifically, are connected to the middles of the left and right side pipes 11e and 11f, and are structured from a pair of left and right round pipe members extending upward. The center roof supports 17 are divided into lower portions 17a and upper portions 17b, and are connected by a plurality of bolts 17c that penetrate through in the forward/backward direction of the vehicle.

The rear roof supports 18 are disposed at the rear end portions on the left and right side portions of the center frame 11, further towards the rear, in the front/back direction of the vehicle, from the center roof supports 17, and, specifically, are structured from a pair of left and right round pipes that extend upwards from the rear end portion of the left and right side pipes 11e and 11f. The rear roof supports 18 are divided into lower portions 18a and upper portions 18b, and are connected by a plurality of bolts 18c that penetrate through in the forward/backward direction of the vehicle.

The roof member 14 comprises left and right side roof pipes 19 and 20, which extend in the forward/backward direction of the vehicle and which connect together the upper end portions of the front, center, and rear roof pipes 16, 17, and 18, and further comprises front, center, and rear cross roof pipes 21, 22, and 23, extending in the direction of width of the vehicle, which connect together the front end portions, connect together the center portions, and connect together the rear end portions of the left and right side roof pipes 19 and 20.

The left side roof pipe 19 is divided into a forward portion 19*a* and a rear portion 19*b*, and is connected by a plurality of bolts 19*c* that penetrate through in the direction of width of the vehicle. Similarly, the right side roof type 20 is divided into a forward portion 20*a* and a rear portion 20*b*, and is connected by a plurality of bolts 20*c* that penetrate through in the direction of width of the vehicle.

The front, center, and rear cross roof pipes 21, 22, and 23 are connected by a plurality of bolts 21*a*, 22*a*, and 23*a*, which penetrate in the direction of width of the vehicle, to the left and right side roof pipes 19 and 20.

Here the front roof supports 16, when viewed from the side of the vehicle, are formed with bends so as to resemble "<" signs overall, and, in the vicinities of the bent portions 16*d*, are divided into the lower portions 16*a* and the upper portions 16*b*.

Additionally, the center roof supports 17, when viewed from the side of the vehicle, are disposed so as to be essentially coincident with the backrest portions 7*b* of the front seats 7. Furthermore, the lower portions 17*d* of the center roof supports 17, which are lower than the headrest portions 7*c* of the front seats 7 are inclined so as to be positioned further forward the further down. Additionally, the bottom edge portions 17*e* of the center roof supports 17 are positioned so as to be further forward from the rear end portion 7*f* of the front seat 7. In more detail, the bottom edge portions 17*e* are positioned so as to be further forward than the rear end portions 7*g'* of the seat cushion portion 7*a* and the bottom end portion 7*g* of the backrest portion 7*b*.

Additionally, the center roof supports 17 are provided with grip portions 17*f* that can be grasped by the passengers of the rear seat 8. These grip portions 17*f* are disposed at positions that are higher than the seating surfaces 7*e* of the front seat 7, and the seating surface 8*g* of the rear seat 8.

In addition, the lower portions 18*d* of the rear roof support 18, which are positioned lower than the seating surface 8*g* of the rear seat 8, are inclined backwards so as to be essentially parallel with the lower portions 17*d* of the center roof supports 17, positioned so as to be further back the higher on the lower portions 18*d*. The upper end portions 18*f* of the lower portions 18*d* are positioned to the rear of the front end portion 8*h* of the rear seat 8.

The middle portions 18*e*, of the rear roof supports 18, which extend upward from the upper end portions 18*f* of the lower portions 18*d*, are inclined backwards even more than are the lower portions 18*d*. Additionally, these middle portions 18*e*, when viewed from the side of the vehicle, extend towards the rear, in the forward/backward direction of the vehicle, cutting across the backrest portion 8*b* of the rear seat 8.

Additionally, the bar-shaped members 18*h* are disposed higher than the middle portions 18*e*, and these bar-shaped members 18*h* are covered by plastic covers 18*g*. The covers 18*g* structure surfaces that are wide in the forward/backward direction of the vehicle and in the vertical direction.

Here front doors 34 are disposed on the left and right sides, in the direction of width of the vehicle, of the foot space of the front seat 7. Note that 36 is a side cover that is disposed to the side of the front seat 7. Also, rear doors 35 are disposed on the left and right sides, in the direction of width of the vehicle, of the foot space of the rear seat 8.

Given the vehicle 1 as set forth in the present embodiment, the center console 29, having the left and right side walls 29*a* and 29*b* integrated with the left and right extending portions 5*a'* and 5*a'* is combined with top wall 29*c*, to define an inner space C. The center console 29 passes from the center portion of the front panel 5 between the front floors 5*a* and 5*a*, and between the front seats 7 and 7, and extends to the vicinity of the back end portion of the front seats 7 and 7, where the top wall 29*c* is higher than the highest point b of the seating surface 7*e* of the front seats 7 and 7, and positioned lower than the top end 5*b* of the front panel 5. Because of this, this enables the inner space C of the center console 29 to be formed wider, without having an effect on the feeling of openness for the passengers, enabling the space to be used more effectively. In other words, because the passengers riding in the front seats 7 and 7 do not move in the direction of width of the vehicle, the space between the front floors 5*a* and 5*a* do not have an effect on the feeling of openness of the passengers, so that space can be used to make the center console 29 larger. In the present embodiment, the inner space C can be made larger through forming the inner space C ranging from the front end to the back end of the center console 29.

The present embodiment enables the placement of the upper portion of an engine unit 6, a high-capacity large surge tank 6*g*, and the like, within the inner space C. Note that this inner space C can be used as a space for the placement of vehicle components, such as the battery, or as storage space for passenger luggage, or the like.

Additionally, this inner space C of the center console 29 communicates with the forward space B under the hood via front panel 5, making it possible to use the spaces C and B integrally, making it easy to place the vacuum system, which is long in the front/back direction, comprising the vacuum pipes 6*f*, the surge tank 6*g*, and the air cleaner 6*h*, and the like, which are connected to the engine unit 6.

Additionally, because the inner space C and the space D under the front seat 7 are connected, not only can the upper portion of the engine unit 6 be placed within the inner space C, but also the lower portion of the engine unit 6 and the transmission case 6*j* can be positioned in the space D under the front seat 7. In particular, it is possible to achieve a reduction in the vehicle width because the transmission case 6*j*, which is wide in the direction of width of the vehicle, when compared to the top portion, can use the space D under the seat.

Additionally, the inner space C and the space D under the seat are continuous, so that, for those portions that are forward of the front seat 7, the left and right extension portions 5*a'* of the front floors 5*a* can be connected to the left and right side walls 29*a* and 29*b*, and also the aforementioned communication can be achieved without providing a floor member for the portion between the front seats 7 and 7, and thus it is possible to have the bottom edge shape of the left and right side walls 29*a* and 29*b* of the center console 29 extend in straight lines in the front/back direction of the vehicle, making it possible to simplify the shapes of the left and right front walls 29*a* and 29*b*.

Additionally, because the rear tunnel portion 32 is formed so as to communicate with the inner space C, the exhaust system, and particularly the exhaust pipe routing, of the engine unit 6 can be achieved easily.

Furthermore, because the spaces B and C, the under seat space D, and the rear tunnel portion 32 are all connected, these can be used to layout the vacuum system and exhaust system, and the like, of the engine unit 6 integrally.

Furthermore, because the controls 31a and 31b that are operated by the passengers are disposed forward from the front seat 7 and to the rear of the front panel 5, on the top wall 29c of the center console 29, these controls may be positioned so as to not interfere with the feeling of openness by the passenger. Additionally, because the portion of the top wall 29c of the center console 29 that is to the rear of the front panel 5 and forward from the front seat 7 is the inclined wall 29c' that is inclined so as to be higher the further forward, the closer to the passenger that is seated in the front seat 7, the greater the distance of separation in the direction of height, making it possible to expand the inner space of the center console while maintaining the feeling of openness by the passenger.

In addition, the rear tunnel portion 32 is formed at a position that is lower than the seating surface 7e of the front seat 7, and behind the front seat 7, and because cup holders 32a are formed in this portion, this is able to increase the convenience for the passenger.

Furthermore, because a forward/backward position adjusting mechanism 25 that enables the adjustment of the position of the front seat 7 in the front/back direction of the vehicle is provided, the position of the front seat 7 can be adjusted to a position wherein it is possible to obtain a feeling of openness, depending on the passenger in the front seat, making it possible to increase the comfort of the front seat passenger.

Additionally, the forward/backward adjusting mechanism 25 is structured from a slide rail 26 that supports the front seat 7 so as to be able to move in the front and back directions, a plurality of locking pins 26c that are provided on the slide rail 26, and a locking pawl 28b that can interlock with the locking pins 26, and thus the position of the front seat 7 in the forward/back direction can be adjusted using a simple mechanism.

The locked state of the locking pawl 28b can be maintained because an operating portion 28e for disengaging the interlock between the locking pawl 28b and the locking pin 26c is provided. In this case, the operating portion 28e can be moved to the unlocked position through pushing on the locking piece 28i.

Note that while a vehicle that is provided with a pair of left and right rear wheels was described in the embodiment set forth above, the present invention can also be applied to vehicles having two pairs of left and right rear wheels, or in other words, 6-wheeled vehicles.

Additionally, while in the present embodiment a case was explained wherein a front seat 7 and a rear seat 8 were provided, the present invention can also be applied to a vehicle wherein only a front seat is provided.

We claim:
1. A vehicle comprising:
a vehicle body frame;
a front roof support carried by the vehicle body frame;
a rear roof support carried by the vehicle body frame;
a roof member carried by the front and rear roof supports and defining a cabin space therein;
a pair of left and right front wheels and at least a pair of left and right rear wheels carried by the vehicle body frame;
an engine including a crank case and a cylinder, the cylinder being connected to an upper portion of the crank case;
a transmission connected to the engine;
a vacuum pipe arranged to provide air to the cylinder, the vacuum pipe arranged forwardly of the cylinder;
a front panel arranged behind, in a front/back direction of the vehicle, the pair of left and right front wheels and at least partially disposed within the cabin space;
a left front seat offset from a right front seat in a width direction of the vehicle and defining a center console channel therebetween;
a center console disposed within the center console channel and arranged behind the front panel in the front/back direction of the vehicle, the center console including left and right side walls and a top wall defining a center console interior therein, the center console extending rearward, in the front/back direction of the vehicle, from the front panel to at least a rear end of the left and right front seats; wherein
an entire surface of the top wall of the center console is disposed at a position higher than a top seating surface of the left and right front seats, a position higher than a top end of the engine and the transmission, and a position lower than a top end of the front panel;
the vacuum pipe is disposed within the center console and at a position higher than a lower end of the engine; and
the vacuum pipe is located at a position higher than a lower end of the cylinder.
2. The vehicle of claim 1, wherein the engine is disposed within the center console interior.
3. The vehicle of claim 1, further comprising a front frame defining a front space covered by a hood, wherein the center console interior is in communication with the front space via the front panel.
4. The vehicle of claim 3, wherein components of the engine disposed within the center console interior and the front space are in mechanical communication with each other.
5. The vehicle of claim 1, wherein the left and right front seats are arranged on a seat frame member defining an open space disposed beneath the left and right front seats, and the center console interior is in communication with the open space disposed beneath the left and right front seats.
6. The vehicle of claim 5, wherein components of the engine are disposed within the center console interior and the open space disposed beneath the left and right front seats.
7. The vehicle of claim 1, wherein the center console interior communicates with a space that is forward of the front panel and a space that is under the left and right front seats.
8. The vehicle of claim 1, wherein the center console passes between the left and right front seats and extends to a vicinity of the rear end of the left and right front seats; and
the center console interior is defined by a space extending from a front end portion of the center console to a rear end portion of the center console.
9. The vehicle of claim 1, further comprising a control operated by an operator of the vehicle and arranged in the top wall of the center console, the control arranged forward of the left and right front seats and rearward of the front panel.
10. The vehicle of claim 9, wherein a portion of the top wall of the center console that is rearward of the front panel and forward of the left and right front seats is inclined so as to be higher as it extends forward.
11. The vehicle of claim 1, further comprising a cup holder provided in a position that is rearward of the left and right front seats and lower than the top seating surface of the left and right front seats.
12. The vehicle of claim 1, wherein the left and right front seats are provided with a forward/backward position adjusting mechanism to enable adjustments of the front/back position of the left and right front seats.
13. The vehicle of claim 12, wherein the forward/backward position adjusting mechanism includes:

a rail member, disposed under the left and right front seats, to support the left and right front seats so as to be able to move forward and backward;

a plurality of rod-shaped members disposed on the rail member and spaced apart in the front/back direction of the vehicle and arranged to protrude in the width direction of the vehicle; and a locking member protruding in a downward direction from a bottom portion of the left and right front seats, and arranged to interlock with the rod-shaped members.

14. The vehicle of claim 12, wherein the forward/backward position adjusting mechanism is further provided with a lock releasing preventing mechanism arranged to prevent movement of the locking member to a released position.

15. A vehicle comprising:
a vehicle body frame;
a front roof support carried by the vehicle body frame;
a rear roof support carried by the vehicle body frame;
a roof member carried by the front and rear roof supports and defining a cabin space therein;
a pair of left and right front wheels and at least a pair of left and right rear wheels carried by the vehicle body frame;
an engine including a crank case and a cylinder, the cylinder being connected to an upper portion of the crank case;
a transmission connected to the engine;
a vacuum pipe arranged to provide air to the cylinder, the vacuum pipe arranged forwardly of the cylinder;
a front panel arranged behind, in a front/back direction of the vehicle, the pair of left and right front wheels and at least partially disposed within the cabin space;
a left front seat offset from a right front seat in a width direction of the vehicle and defining a center console channel therebetween;
a center console disposed within the center console channel and arranged behind the front panel in the front/back direction of the vehicle, the center console including left and right side walls and a to wall defining a center console interior therein, the center console extending rearward, in the front/back direction of the vehicle, from the front panel to at least a rear end of the left and right front seats; wherein
an entire surface of the to wall of the center console is disposed at a position higher than a to seating surface of the left and right front seats, a position higher than a top end of the engine and the transmission, and a position lower than a top end of the front panel;
the vacuum pipe is disposed within the center console and at a position higher than a lower end of the engine; and
vehicle further comprises a surge tank connected to the vacuum pipe, wherein the surge tank is arranged within the center console.

16. The vehicle of claim 15, wherein the engine is disposed within the center console interior.

17. The vehicle of claim 15, further comprising a front frame defining a front space covered by a hood, wherein the center console interior is in communication with the front space via the front panel.

18. The vehicle of claim 17, wherein components of the engine disposed within the center console interior and the front space are in mechanical communication with each other.

19. The vehicle of claim 15, wherein the left and right front seats are arranged on a seat frame member defining an open space disposed beneath the left and right front seats, and the center console interior is in communication with the open space disposed beneath the left and right front seats.

20. The vehicle of claim 19, wherein components of the engine are disposed within the center console interior and the open space disposed beneath the left and right front seats.

21. The vehicle of claim 15, wherein the center console interior communicates with a space that is forward of the front panel and a space that is under the left and right front seats.

22. The vehicle of claim 15, wherein the center console passes between the left and right front seats and extends to a vicinity of the rear end of the left and right front seats; and
the center console interior is defined by a space extending from a front end portion of the center console to a rear end portion of the center console.

23. The vehicle of claim 15, further comprising a control operated by an operator of the vehicle and arranged in the top wall of the center console, the control arranged forward of the left and right front seats and rearward of the front panel.

24. The vehicle of claim 23, wherein a portion of the top wall of the center console that is rearward of the front panel and forward of the left and right front seats is inclined so as to be higher as it extends forward.

25. The vehicle of claim 15, further comprising a cup holder provided in a position that is rearward of the left and right front seats and lower than the top seating surface of the left and right front seats.

26. The vehicle of claim 15, wherein the left and right front seats are provided with a forward/backward position adjusting mechanism to enable adjustments of the front/back position of the left and right front seats.

27. The vehicle of claim 26, wherein the forward/backward position adjusting mechanism includes:
a rail member, disposed under the left and right front seats, to support the left and right front seats so as to be able to move forward and backward;
a plurality of rod-shaped members disposed on the rail member and spaced apart in the front/back direction of the vehicle and arranged to protrude in the width direction of the vehicle; and
a locking member protruding in a downward direction from a bottom portion of the left and right front seats, and arranged to interlock with the rod-shaped members.

28. The vehicle of claim 26, wherein the forward/backward position adjusting mechanism is further provided with a lock releasing preventing mechanism arranged to prevent movement of the locking member to a released position.

* * * * *